United States Patent
Sugiura

(10) Patent No.: US 9,139,721 B2
(45) Date of Patent: Sep. 22, 2015

(54) RUBBER COMPOSITION FOR TIRE TREADS

(71) Applicant: The Yokohama Rubber Co., LTD., Minato-ku, Tokyo (JP)

(72) Inventor: Hiroki Sugiura, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/379,271

(22) PCT Filed: Feb. 15, 2013

(86) PCT No.: PCT/JP2013/053770
§ 371 (c)(1),
(2) Date: Aug. 15, 2014

(87) PCT Pub. No.: WO2013/122237
PCT Pub. Date: Aug. 22, 2013

(65) Prior Publication Data
US 2015/0031791 A1 Jan. 29, 2015

(30) Foreign Application Priority Data

Feb. 15, 2012 (JP) ................................. 2012-031133

(51) Int. Cl.
| | |
|---|---|
| B60C 1/00 | (2006.01) |
| C08K 3/36 | (2006.01) |
| C08L 93/00 | (2006.01) |
| C08L 9/06 | (2006.01) |
| C08L 9/00 | (2006.01) |
| C08L 15/00 | (2006.01) |
| C08C 19/25 | (2006.01) |
| C08K 3/04 | (2006.01) |
| C08C 19/44 | (2006.01) |

(52) U.S. Cl.
CPC ... *C08L 9/06* (2013.01); *B60C 1/00* (2013.01); *B60C 1/0016* (2013.01); *C08C 19/25* (2013.01); *C08K 3/04* (2013.01); *C08K 3/36* (2013.01); *C08L 9/00* (2013.01); *C08L 15/00* (2013.01); *C08C 19/44* (2013.01); *C08L 2205/025* (2013.01); *C08L 2205/035* (2013.01)

(58) Field of Classification Search
CPC .......... B60C 1/0016; C08K 3/36; C08L 93/00

USPC ............................................ 524/77, 493, 575
See application file for complete search history.

(56) References Cited

U.S. PATENT DOCUMENTS

| | | | |
|---|---|---|---|
| 5,929,149 A | 7/1999 | Matsuo et al. | |
| 7,700,693 B2 * | 4/2010 | Karato et al. | 525/209 |
| 8,362,118 B2 * | 1/2013 | Mihara | 524/77 |
| 2008/0275184 A1 | 11/2008 | Karato et al. | |
| 2011/0144236 A1 | 6/2011 | Mihara | |
| 2013/0338255 A1 | 12/2013 | Naka et al. | |

FOREIGN PATENT DOCUMENTS

| | | |
|---|---|---|
| DE | 697 04 605 | 8/2001 |
| DE | 10 2010 062 557 | 9/2011 |
| DE | 11 2011 104 012 | 8/2013 |
| JP | 2007-321046 | 12/2007 |
| JP | 2009-91498 | 4/2009 |
| JP | 2009138157 A * | 6/2009 |
| JP | 2009-263587 | 11/2009 |
| JP | 2011-122057 | 6/2011 |
| WO | WO 2005/021637 | 3/2005 |
| WO | WO 2012/073837 | 6/2012 |
| WO | WO 2012/073838 | 6/2012 |
| WO | WO 2012/073841 | 6/2012 |

OTHER PUBLICATIONS

International Search Report dated Apr. 16, 2013, 4 pages, Japan.

* cited by examiner

*Primary Examiner* — Vickey Nerangis
(74) *Attorney, Agent, or Firm* — Thorpe North & Western

(57) ABSTRACT

A rubber composition comprises, per 100 parts by weight of a diene rubber containing from 35% to 89% by weight of a modified conjugated diene polymer rubber and from 11% to 40% by weight of a butadiene rubber, from 3 to 60 parts by weight of an aromatic modified terpene resin and from 100 to 150 parts by weight of a filler. A ratio of the compounded amount of the aromatic modified terpene resin to the compounded amount of the butadiene rubber is from 0.5 to 1.3. An aromatic vinyl unit content is from 38% to 48% by weight of the modified conjugated diene polymer rubber, with a vinyl unit content being from 20% to 35% by weight of the modified conjugated diene polymer rubber, and a weight-average molecular weight of the modified conjugated diene polymer rubber being from 600,000 to 1,000,000.

11 Claims, 11 Drawing Sheets

FIG. 1A

|  |  | Working Example 1 | Working Example 2 | Working Example 3 | Working Example 4 | Working Example 5 |
|---|---|---|---|---|---|---|
| Modified S-SBR 1 | pbw | 62.5(50) | 62.5(50) | 62.5(50) | 56.3(45) | 75.0(60) |
| Modified S-SBR 2 | pbw |  |  |  |  |  |
| Modified S-SBR 3 | pbw |  |  |  |  |  |
| Modified S-SBR 10 | pbw | 34.4(25) | 34.4(25) | 34.4(25) | 34.4(25) | 34.4(25) |
| BR(Wbr) | pbw | 25 | 25 | 25 | 30 | 15 |
| Silica-a (silica 1) | pbw | 100 | 100 | 100 | 100 | 100 |
| Silica-b | pbw | 20 | 20 | 20 | 20 | 20 |
| CB1 | pbw | 10 | 10 |  | 10 | 10 |
| CB2 | pbw |  |  | 10 |  |  |
| Terpene resin 1 (Wte) | pbw | 20 | 40 | 20 | 24 | 12 |
| Coupling agent | pbw | 10 | 10 | 10 | 10 | 10 |
| Oil | pbw | 18 | 18 | 18 | 19 | 16 |
| Total filler | pbw | 130 | 130 | 120 | 130 | 130 |
| Ratio of silica in filler | Weight% | 92 | 92 | 100 | 92 | 92 |
| Ratio of silica 1 in silica | Weight% | 83 | 83 | 83 | 83 | 83 |
| Ratio Wte/Wbr | - | 0.8 | 1.3 | 0.8 | 0.8 | 0.8 |
| Extension oil in rubber | pbw | 22 | 22 | 22 | 21 | 24 |
| Rolling resistance | Index value | 92 | 94 | 90 | 90 | 97 |
| Wet performance | Index value | 108 | 111 | 103 | 104 | 112 |
| Wear resistance | Index value | 106 | 104 | 102 | 110 | 104 |

FIG. 1B

|  |  | Working Example 6 | Working Example 7 | Working Example 8 | Working Example 9 | Working Example 10 |
|---|---|---|---|---|---|---|
| Modified S-SBR 1 | pbw | 93.8(75) | 62.5(50) | 62.5(50) |  |  |
| Modified S-SBR 2 | pbw |  |  |  | 62.5(50) |  |
| Modified S-SBR 3 | pbw |  |  |  |  | 62.5(50) |
| Modified S-SBR 10 | pbw |  | 34.4(25) | 34.4(25) | 34.4(25) | 34.4(25) |
| BR(Wbr) | pbw | 25 | 25 | 25 | 25 | 25 |
| Silica-a (silica 1) | pbw | 100 | 120 | 90 | 100 | 100 |
| Silica-b | pbw | 20 | 0 | 30 | 20 | 20 |
| CB1 | pbw | 10 | 10 | 10 | 10 | 10 |
| CB2 | pbw |  |  |  |  |  |
| Terpene resin 1 (Wte) | pbw | 20 | 20 | 20 | 20 | 20 |
| Coupling agent | pbw | 10 | 10 | 10 | 10 | 10 |
| Oil | pbw | 21 | 18 | 18 | 18 | 18 |
| Total filler | pbw | 130 | 130 | 130 | 130 | 130 |
| Ratio of silica in filler | Weight% | 92 | 92 | 92 | 92 | 92 |
| Ratio of silica 1 in silica | Weight% | 83 | 100 | 75 | 83 | 83 |
| Ratio Wte/Wbr | - | 0.8 | 0.8 | 0.8 | 0.8 | 0.8 |
| Extension oil in rubber | pbw | 19 | 22 | 22 | 22 | 22 |
| Rolling resistance | Index value | 84 | 96 | 91 | 94 | 98 |
| Wet performance | Index value | 111 | 107 | 110 | 106 | 103 |
| Wear resistance | Index value | 113 | 108 | 104 | 105 | 103 |

FIG. 2A

|  |  | Comparative Example 1 | Comparative Example 2 | Comparative Example 3 |
|---|---|---|---|---|
| Modified S-SBR 1 | pbw |  |  |  |
| Modified S-SBR 4 | pbw |  | 60.0(50) |  |
| Modified S-SBR 5 | pbw |  |  |  |
| Modified S-SBR 6 | pbw |  |  |  |
| Modified S-SBR 7 | pbw |  |  |  |
| Modified S-SBR 8 | pbw |  |  |  |
| Modified S-SBR 9 | pbw |  |  |  |
| Modified S-SBR 10 | pbw | 103.1(75) | 34.4(25) | 34.4(25) |
| S-SBR | pbw |  |  | 68.8(50) |
| BR (Wbr) | pbw | 25 | 25 | 25 |
| Silica-a (silica 1) | pbw | 100 | 100 | 100 |
| Silica-b | pbw | 20 | 20 | 20 |
| CB1 | pbw | 10 | 10 | 10 |
| Terpene resin 1 (Wte) | pbw | 20 | 20 | 20 |
| Coupling agent | pbw | 10 | 10 | 10 |
| Oil | pbw | 12 | 21 | 12 |
| Total filler | pbw | 130 | 130 | 130 |
| Ratio of silica in filler | Weight% | 92 | 92 | 92 |
| Ratio of silica 1 in silica | Weight% | 83 | 83 | 83 |
| Ratio Wte/Wbr | - | 0.8 | 0.8 | 0.8 |
| Extension oil in rubber | pbw | 28 | 19 | 28 |
| Rolling resistance | Index value | 100 | 102 | 104 |
| Wet performance | Index value | 100 | 97 | 102 |
| Wear resistance | Index value | 100 | 98 | 100 |

FIG. 2B

|  |  | Comparative Example 4 | Comparative Example 5 | Comparative Example 6 |
|---|---|---|---|---|
| Modified S-SBR 1 | pbw |  |  |  |
| Modified S-SBR 4 | pbw |  |  |  |
| Modified S-SBR 5 | pbw | 50 |  |  |
| Modified S-SBR 6 | pbw |  | 62.5(50) |  |
| Modified S-SBR 7 | pbw |  |  | 62.5(50) |
| Modified S-SBR 8 | pbw |  |  |  |
| Modified S-SBR 9 | pbw |  |  |  |
| Modified S-SBR 10 | pbw | 34.4(25) | 34.4(25) | 34.4(25) |
| S-SBR | pbw |  |  |  |
| BR (Wbr) | pbw | 25 | 25 | 25 |
| Silica-a (silica 1) | pbw | 100 | 100 | 100 |
| Silica-b | pbw | 20 | 20 | 20 |
| CB1 | pbw | 10 | 10 | 10 |
| Terpene resin 1 (Wte) | pbw | 20 | 20 | 20 |
| Coupling agent | pbw | 10 | 10 | 10 |
| Oil | pbw | 31 | 18 | 18 |
| Total filler | pbw | 130 | 130 | 130 |
| Ratio of silica in filler | Weight% | 92 | 92 | 92 |
| Ratio of silica 1 in silica | Weight% | 83 | 83 | 83 |
| Ratio Wte/Wbr | - | 0.8 | 0.8 | 0.8 |
| Extension oil in rubber | pbw | 9 | 22 | 22 |
| Rolling resistance | Index value | 87 | 91 | 101 |
| Wet performance | Index value | 86 | 96 | 114 |
| Wear resistance | Index value | 112 | 109 | 98 |

FIG. 2C

|  |  | Comparative Example 7 | Comparative Example 8 | Comparative Example 9 |
|---|---|---|---|---|
| Modified S-SBR 1 | pbw |  |  | 43.8(35) |
| Modified S-SBR 4 | pbw |  |  |  |
| Modified S-SBR 5 | pbw |  |  |  |
| Modified S-SBR 6 | pbw |  |  |  |
| Modified S-SBR 7 | pbw |  |  |  |
| Modified S-SBR 8 | pbw | 62.5(50) |  |  |
| Modified S-SBR 9 | pbw |  | 62.5(50) |  |
| Modified S-SBR 10 | pbw | 34.4(25) | 34.4(25) | 27.5(20) |
| S-SBR | pbw |  |  |  |
| BR (Wbr) | pbw | 25 | 25 | 45 |
| Silica-a (silica 1) | pbw | 100 | 100 | 100 |
| Silica-b | pbw | 20 | 20 | 20 |
| CB1 | pbw | 10 | 10 | 10 |
| Terpene resin 1 (Wte) | pbw | 20 | 20 | 36 |
| Coupling agent | pbw | 10 | 10 | 10 |
| Oil | pbw | 18 | 18 | 240 |
| Total filler | pbw | 130 | 130 | 130 |
| Ratio of silica in filler | Weight% | 92 | 92 | 92 |
| Ratio of silica 1 in silica | Weight% | 83 | 83 | 83 |
| Ratio Wte/Wbr | - | 0.8 | 0.8 | 0.8 |
| Extension oil in rubber | pbw | 22 | 22 | 16 |
| Rolling resistance | Index value | 88 | 102 | 92 |
| Wet performance | Index value | 100 | 116 | 92 |
| Wear resistance | Index value | 109 | 101 | 126 |

FIG. 2D

|  |  | Working Example 11 | Working Example 12 | Comparative Example 11 |
|---|---|---|---|---|
| Modified S-SBR 1 | pbw | 50.0(40) | 86.3(69) | 87.5(70) |
| Modified S-SBR 4 | pbw |  |  |  |
| Modified S-SBR 5 | pbw |  |  |  |
| Modified S-SBR 6 | pbw |  |  |  |
| Modified S-SBR 7 | pbw |  |  |  |
| Modified S-SBR 8 | pbw |  |  |  |
| Modified S-SBR 9 | pbw |  |  |  |
| Modified S-SBR 10 | pbw | 27.5(20) | 27.5(20) | 34.4(25) |
| S-SBR | pbw |  |  |  |
| BR (Wbr) | pbw | 40 | 11 | 5 |
| Silica-a (silica 1) | pbw | 100 | 100 | 100 |
| Silica-b | pbw | 20 | 20 | 20 |
| CB1 | pbw | 10 | 10 | 10 |
| Terpene resin 1 (Wte) | pbw | 32 | 9 | 20 |
| Coupling agent | pbw | 10 | 10 | 10 |
| Oil | pbw | 24 | 24 | 13 |
| Total filler | pbw | 130 | 130 | 130 |
| Ratio of silica in filler | Weight% | 92 | 92 | 92 |
| Ratio of silica 1 in silica | Weight% | 83 | 83 | 83 |
| Ratio Wte/Wbr | - | 0.8 | 0.8 | 4 |
| Extension oil in rubber | pbw | 18 | 18 | 27 |
| Rolling resistance | Index value | 94 | 98 | 101 |
| Wet performance | Index value | 100 | 113 | 115 |
| Wear resistance | Index value | 123 | 100 | 94 |

FIG. 3A

|  |  | Comparative Example 11 | Working Example 13 | Working Example 14 | Comparative Example 12 |
|---|---|---|---|---|---|
| Modified S-SBR 1 | pbw | 37.5(30) | 43.8(35) | 106.3(85) | 118.8(95) |
| Modified S-SBR 10 | pbw | 61.9(45) | 55.0(40) |  |  |
| BR (Wbr) | pbw | 25 | 25 | 15 | 5 |
| Silica-a (silica 1) | pbw | 100 | 100 | 100 | 100 |
| Silica-b | pbw | 20 | 20 | 20 | 20 |
| CB1 | pbw | 10 | 10 | 10 | 10 |
| Terpene resin 1 (Wte) | pbw | 20 | 20 | 20 | 20 |
| Terpene resin 2 (Wte) | pbw |  |  |  |  |
| Terpene resin 3 (Wte) | pbw |  |  |  |  |
| Coupling agent | pbw | 10 | 10 | 10 | 10 |
| Oil | pbw | 16.0 | 17.0 | 17.0 | 17.0 |
| Total filler | pbw | 130 | 130 | 130 | 130 |
| Ratio of silica in filler | Weight% | 92 | 92 | 92 | 92 |
| Ratio of silica 1 in silica | Weight% | 83 | 83 | 83 | 83 |
| Ratio Wte/Wbr | - | 0.8 | 0.8 | 1.3 | 4.0 |
| Extension oil in rubber | pbw | 24 | 24 | 21 | 23 |
| Rolling resistance | Index value | 105 | 88 | 99 | 99 |
| Wet performance | Index value | 104 | 103 | 115 | 119 |
| Wear resistance | Index value | 100 | 112 | 102 | 93 |

FIG. 3B

|  |  | Comparative Example 13 | Working Example 15 | Comparative Example 14 | Working Example 16 |
|---|---|---|---|---|---|
| Modified S-SBR 1 | pbw | 62.5(50) | 62.5(50) | 62.5(50) | 62.5(50) |
| Modified S-SBR 10 | pbw | 34.4(25) | 34.4(25) | 34.4(25) | 34.4(25) |
| BR (Wbr) | pbw | 25 | 25 | 25 | 25 |
| Silica-a (silica 1) | pbw | 65 | 60 | 55 | 60 |
| Silica-b | pbw | 15 | 10 | 15 | 50 |
| CB1 | pbw | 10 | 30 | 60 | 40 |
| Terpene resin 1 (Wte) | pbw | 20 | 20 | 20 | 20 |
| Terpene resin 2 (Wte) | pbw |  |  |  |  |
| Terpene resin 3 (Wte) | pbw |  |  |  |  |
| Coupling agent | pbw | 10 | 10 | 10 | 10 |
| Oil | pbw | 18.0 | 18.0 | 18.0 | 18.0 |
| Total filler | pbw | 90 | 100 | 130 | 150 |
| Ratio of silica in filler | Weight% | 89 | 70 | 54 | 73 |
| Ratio of silica 1 in silica | Weight% | 81 | 71 | 79 | 71 |
| Ratio Wte/Wbr | - | 0.8 | 0.8 | 0.8 | 0.8 |
| Extension oil in rubber | pbw | 22 | 22 | 22 | 22 |
| Rolling resistance | Index value | 79 | 86 | 110 | 100 |
| Wet performance | Index value | 91 | 100 | 99 | 114 |
| Wear resistance | Index value | 100 | 114 | 109 | 100 |

FIG. 3C

|  |  | Comparative Example 15 | Working Example 17 | Comparative Example 16 | Working Example 18 |
|---|---|---|---|---|---|
| Modified S-SBR 1 | pbw | 62.5(50) | 75(60) | 62.5(50) | 62.5(50) |
| Modified S-SBR 10 | pbw | 34.4(25) | 38.5(28) | 34.4(25) | 34.4(25) |
| BR (Wbr) | pbw | 25 | 12 | 25 | 25 |
| Silica-a (silica 1) | pbw | 120 | 100 | 100 | 100 |
| Silica-b | pbw | 25 | 20 | 20 | 20 |
| CB1 | pbw | 15 | 10 | 10 | 10 |
| Terpene resin 1 (Wte) | pbw | 20 | 6 | 8 | 12 |
| Terpene resin 2 (Wte) | pbw |  |  |  |  |
| Terpene resin 3 (Wte) | pbw |  |  |  |  |
| Coupling agent | pbw | 10 | 10 | 10 | 10 |
| Oil | pbw | 18.0 | 18.0 | 18.0 | 18.0 |
| Total filler | pbw | 160 | 130 | 130 | 130 |
| Ratio of silica in filler | Weight% | 91 | 92 | 92 | 92 |
| Ratio of silica 1 in silica | Weight% | 83 | 83 | 83 | 83 |
| Ratio Wte/Wbr | - | 0.8 | 0.5 | 0.3 | 0.5 |
| Extension oil in rubber | pbw | 22 | 24 | 22 | 22 |
| Rolling resistance | Index value | 107 | 86 | 94 | 85 |
| Wet performance | Index value | 116 | 102 | 100 | 101 |
| Wear resistance | Index value | 108 | 113 | 105 | 114 |

FIG. 3D

|  |  | Comparative Example 17 | Working Example 19 | Comparative Example 18 | Working Example 20 |
|---|---|---|---|---|---|
| Modified S-SBR 1 | pbw | 62.5(50) | 50(40) | 62.5(50) | 62.5(50) |
| Modified S-SBR 10 | pbw | 34.4(25) | 27.5(20) | 34.4(25) | 34.4(25) |
| BR (Wbr) | pbw | 25 | 40 | 25 | 25 |
| Silica-a (silica 1) | pbw | 100 | 100 | 100 | 100 |
| Silica-b | pbw | 20 | 20 | 20 | 20 |
| CB1 | pbw | 10 | 10 | 10 | 10 |
| Terpene resin 1 (Wte) | pbw | 40 | 50 |  |  |
| Terpene resin 2 (Wte) | pbw |  |  | 20 |  |
| Terpene resin 3 (Wte) | pbw |  |  |  | 20 |
| Coupling agent | pbw | 10 | 10 | 10 | 10 |
| Oil | pbw | 18.0 | 18.0 | 18.0 | 18.0 |
| Total filler | pbw | 130 | 130 | 130 | 130 |
| Ratio of silica in filler | Weight% | 92 | 92 | 92 | 92 |
| Ratio of silica 1 in silica | Weight% | 83 | 83 | 83 | 83 |
| Ratio Wte/Wbr | - | 1.6 | 1.3 | 0.0 | 0.0 |
| Extension oil in rubber | pbw | 22 | 18 | 22 | 22 |
| Rolling resistance | Index value | 103 | 97 | 99 | 90 |
| Wet performance | Index value | 118 | 113 | 97 | 106 |
| Wear resistance | Index value | 98 | 100 | 103 | 105 |

FIG. 4

| Stearic acid | 2 parts by weight |
| Antiaging agent | 2 parts by weight |
| Wax | 2 parts by weight |
| Zinc oxide | 2 parts by weight |
| Sulfur | 2 parts by weight |
| Vulcanization accelerator 1 | 2 parts by weight |
| Vulcanization accelerator 2 | 1.5 parts by weight |

RUBBER COMPOSITION FOR TIRE TREADS

TECHNICAL FIELD

The present technology relates to a rubber composition for use in tire treads and particularly relates to a rubber composition for use in tire treads that enhances low rolling resistance, wet performance and wear resistance to conventional levels or above.

BACKGROUND

Increased interest in global environmental issues has led to a demand for superior fuel consumption performance in pneumatic tires for high-performance vehicles, along with steering stability and braking performance when traveling on wet road surfaces. As a result, by compounding silica in rubber compositions that form tread portions, dynamic viscoelasticity characteristics of the tread rubber such as loss tangent (tan δ) and the like has been improved, heat build-up has been suppressed, rolling resistance reduced, and fuel consumption performance improved, in addition to improving wet performance. However, silica has poor affinity with diene rubber and dispersibility tends to be insufficient. Particularly, when the particle diameter of the silica is small, dispersibility worsens and, as a result, the effects of achieving reduced heat build-up and improving wet performance have not been obtainable. Additionally, its reinforcement action is small compared to carbon black, and it has not been possible to fully assure wear resistance.

To resolve this problem, Japanese Unexamined Patent Application Publication No. 2009-91498A proposes improving the dispersibility of silica by a rubber composition in which silica is compounded in a terminal-modified solution polymerization styrene butadiene rubber where the terminals are modified by a polyorganosiloxane or the like, thereby reducing heat build-up (tan δ at 60° C.), enhancing wet grip performance (tan δ at 0° C.) and improving wear resistance. Additionally, Japanese Unexamined Patent Application Publication No. 2007-321046A proposes a rubber composition comprising a styrene-butadiene copolymer rubber and, per 100 parts by weight thereof, from 80 to 180 parts by weight of a filler comprising not less than 50 parts by weight of a silica, and from 5 to 60 parts by weight of a resin having a softening point of 100 to 150° C.

SUMMARY

The present technology provides a rubber composition for use in tire treads by which low rolling resistance and wet performance can be enhanced to or beyond conventional levels.

The rubber composition for use in tire treads of the present technology comprises, per 100 parts by weight of a diene rubber containing from 35% to 89% by weight of a modified conjugated diene polymer rubber and from 11% to 40% by weight of a butadiene rubber, from 3 to 60 parts by weight of an aromatic modified terpene resin and from 100 to 150 parts by weight of a filler; the filler containing not less than 70% by weight of a silica; a ratio Wte/Wbr of the compounded amount of the aromatic modified terpene resin Wte to the compounded amount of the butadiene rubber Wbr being from 0.5 to 1.3; the modified conjugated diene polymer rubber having a terminal modified group, obtained by reacting at least one type of compound comprising a functional group that is reactable with an active terminal of an active conjugated diene polymer chain, with the active conjugated diene polymer chain obtained by copolymerizing a conjugated diene monomer and an aromatic vinyl monomer in a hydrocarbon solvent using an organic active metal compound as an initiator; the terminal modified group comprising a functional group that interacts with the silica; an aromatic vinyl unit content being from 38% to 48% by weight of the modified conjugated diene polymer rubber, a vinyl unit content being from 20% to 35% by weight of the modified conjugated diene polymer rubber, and a weight-average molecular weight of the modified conjugated diene polymer rubber being from 600,000 to 1,000,000; and a softening point of the aromatic modified terpene resin being from 100° C. to 150° C.

The rubber composition for use in tire treads of the present technology has a terminal modified group, obtained by reacting at least one type of compound having a functional group that is reactable with the active terminal of an active conjugated diene polymer chain which was obtained by copolymerizing a conjugated diene monomer and an aromatic vinyl monomer, and this terminal modified group comprises a functional group that interacts with silica, and from 3 to 60 parts by weight of aromatic modified terpene resin having a softening point of from 100° C. to 150° C. is compounded in 100 parts by weight of diene rubber containing from 35% to 89% by weight of modified conjugated diene polymer rubber and from 11% to 40% by weight of butadiene rubber of which the aromatic vinyl unit content is from 38% to 48% by weight, the vinyl unit content is from 20% to 35% by weight and the weight-average molecular weight is from 600,000 to 1,000,000, and the ratio Wte/Wbr of the compounded amount of aromatic modified terpene resin Wte to the compounded amount of the butadiene rubber Wbr is from 0.5 to 1.3, and from 100 to 150 parts by weight of filler containing not less than 70% by weight of silica is compounded. As a result, heat build-up and rolling resistance can be reduced and wet performance can be improved due to the fact that affinity between the diene rubber and silica is increased and dispersibility of the silica is improved. In particular, because the modified conjugated diene polymer rubber forms a finely phase-separated state by the aromatic vinyl unit content being configured to be from 38% to 48% by weight, and additionally, because the terminal modified group, obtained by reacting at least one type of compound comprising a functional group that is reactable with the active terminal of the active conjugated diene polymer chain, comprises a functional group that interacts with silica, and the concentration of that terminal modified group is appropriately adjusted by the weight-average molecular weight being configured to be from 600,000 to 1,000,000, the terminal modified group can act effectively on the silica, the dispersibility of the silica can be further improved, the low rolling resistance of the pneumatic tire can be greatly reduced, and its wet performance can be further enhanced. Furthermore, due to the fact that the diene rubber contains from 11% to 40% by weight of butadiene rubber, wear resistance can be enhanced while maintaining excellent low rolling resistance and wet performance. Additionally, because the softening point of the aromatic modified terpene resin is configured to be from 100° C. to 150° C., wet performance can be further improved while maintaining excellent low rolling resistance.

It is preferred that not less than 70% by weight of all the contained silica is silica having a DBP absorption number of from 185 to 250 mL/100 g, and a ratio ($N_2SA/CTAB$) of nitrogen adsorption specific surface area ($N_2SA$) to CTAB specific surface area (CTAB) of from 0.90 to 1.25. By compounding silica in this manner, even if the compounded amount of the filler is large, good rolling resistance and wear resistance can both be obtained.

It is preferred that the nitrogen adsorption specific surface area of the carbon black is from 70 to 165 $m^2/g$, so that both wet performance and rolling resistance can be maintained without diminishing wear resistance.

The compound comprising the functional group that is reactable with the active terminal of the active conjugated diene polymer chain described above preferably comprises at least one type of polyorganosiloxane compound selected from general formulae (I) to (III) below.

Formula 1

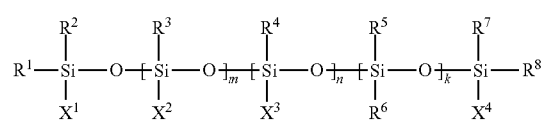

In formula (I), $R^1$ to $R^8$ are identical or different and are alkyl groups having from 1 to 6 carbons or aryl groups having from 6 to 12 carbons; $X^1$ and $X^4$ are identical or different and are groups having functional groups that react with the active terminal of the active conjugated diene polymer chain, alkyl groups having from 1 to 6 carbons, or aryl groups having from 6 to 12 carbons; $X^2$ is a group having a functional group that reacts with the active terminal of the active conjugated diene polymer chain; $X^3$ is a group including from 2 to 20 repeating alkylene glycol units, a portion of the $X^3$ moieties optionally being groups derived from groups including from 2 to 20 repeating alkylene glycol units; and m is an integer from 3 to 200, n is an integer from 0 to 200, and k is an integer from 0 to 200.

Formula 2

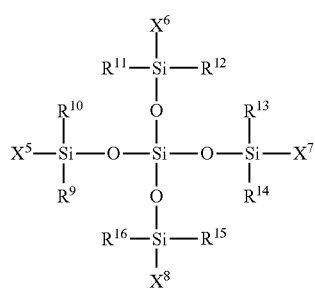

In formula (II), $R^9$ to $R^{16}$ are identical or different and are alkyl groups having from 1 to 6 carbons or aryl groups having from 6 to 12 carbons; and $X^5$ to $X^8$ are groups having functional groups that react with the active terminal of the active conjugated diene polymer chain.

Formula 3

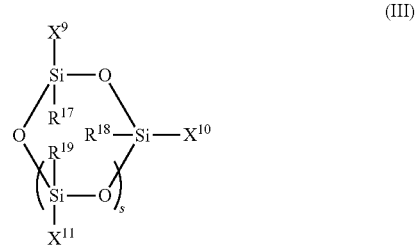

In formula (III), $R^{17}$ to $R^{19}$ are identical or different and are alkyl groups having from 1 to 6 carbons or aryl groups having from 6 to 12 carbons; and $X^9$ to $X^{11}$ are groups having functional groups that react with the active terminal of the active conjugated diene polymer chain; and s is an integer from 1 to 18.

The low rolling resistance, wet performance and wear resistance can be enhanced to or beyond conventional levels via a pneumatic tire in which the rubber composition described above is used in the tread portion.

BRIEF DESCRIPTION OF THE DRAWINGS

FIGS. 1A-1B are drawings showing the components and assessments of the compositions of the working examples and comparative examples of the present technology.

FIGS. 2A-2D are drawings showing the components and assessments of the compositions of the working examples and comparative examples of the present technology.

FIGS. 3A-3D are drawings showing the components and assessments of the compositions of the working examples and comparative examples of the present technology.

FIG. 4 is a drawing illustrating the shared components used in the compositions of the working examples and comparative examples of the present technology.

DETAILED DESCRIPTION

In the rubber composition for use in tire treads of the present technology, the rubber component is a diene rubber, and the diene rubber necessarily comprises a modified conjugated diene polymer rubber and a butadiene rubber. The modified conjugated diene polymer rubber is a conjugated diene polymer rubber produced by solution polymerization, configured to have functional groups at both terminals of the molecular chain. By compounding the modified conjugated diene polymer rubber, affinity with silica is increased, and dispersibility is improved. As a result, the effects of the silica are further enhanced, the low rolling resistance and the wet performance are improved, and the wear resistance is increased.

In the present technology, the backbone of the modified conjugated diene polymer is formed by a copolymer obtained by copolymerizing a conjugated diene monomer and an aromatic vinyl monomer. Examples of the conjugated diene monomer include 1,3-butadiene, isoprene(2-methyl-1,3-butadiene), 2,3-dimethyl-1,3-butadiene, 2-chloro-1,3-butadiene, 1,3-pentadiene, and the like. Examples of the aromatic vinyl monomer include styrene, 2-methylstyrene, 3-methylstyrene, 4-methylstyrene, alpha-methylstyrene, 2,4-dimethylstyrene, 2,4-diisopropylstyrene, 4-tert-butylstyrene, divinylbenzene, tert-butoxystyrene, vinylbenzyldimethylamine, (4-vinylbenzyl)dimethylaminoethyl ether, N,N-dimethyl aminoethylstyrene, vinyl pyridine, and the like.

The terminals of the conjugated diene polymer as a backbone are preferably formed from isoprene unit blocks. As a result of the terminals being formed from isoprene unit blocks, when the terminals are modified and the silica is compounded, affinity between the modified conjugated diene polymer and the silica is excellent and low heat build-up, wet performance and wear resistance are also excellent. Thus, in cases where the conjugated diene monomer units forming the polymer comprise conjugated dienes other than isoprene units, isoprene unit blocks are preferably introduced on the polymer terminals by adding isoprene to a solution containing the polymer having an active terminal prior to adding the compound having the functional group that is reactable with the active terminal of the active conjugated diene polymer chain or, alternatively, between subsequent adding of portions of this compound in the case where this compound is reacted in multiple stages, as will be described later, or in the case where the same or different compounds are reacted sequentially.

In the present technology, the conjugated diene polymer is prepared by copolymerizing the conjugated diene monomer and the aromatic vinyl monomer described above in a hydrocarbon solvent, using an organic active metal compound as an initiator. It is sufficient that the hydrocarbon solvent be a commonly used solvent, and examples thereof include cyclohexane, n-hexane, benzene, toluene, and the like.

The organic active metal catalyst to be used is preferably an organic alkali metal compound, and examples thereof include organic monolithium compounds such as n-butyllithium, sec-butyllithium, t-butyllithium, hexyl lithium, phenyl lithium, stilbene lithium, and the like; organic polyhydric lithium compounds such as dilithiomethane, 1,4-dilithiobutane, 1,4-dilithio-2-ethylcyclohexane, 1,3,5-trilithiobenzene, and the like; organic sodium compounds such as sodium napthalene and the like; and organic potassium compounds such as potassium napthalene and the like. Additionally, 3,3-(N,N-dimethylamino)-1-propyl lithium, 3-(N,N-diethylamino)-1-propyl lithium, 3-(N,N-dipropylamino)-1-propyl lithium, 3-morpholino-1-propyl lithium, 3-imidazole-1-propyl lithium, and organic lithium compounds having their chains extended by 1 to 10 units of butadiene, isoprene, or styrene; and the like can be used.

In the polymerization reaction, a polar aprotic compound such as an ether such as diethylether, diethylene glycol dimethylether, tetrahydrofuran, 2,2-bis(2-oxolanyl)propane, and the like, or an amine such as triethylamine, tetramethyl ethylenediamine, and the like may also be added for the purpose of randomly copolymerizing the aromatic vinyl monomer and the conjugated diene monomer.

In the present technology, at least one type of compound having a reactable functional group is attached to the active terminal of the active conjugated diene polymer chain obtained by copolymerizing the conjugated diene monomer and the aromatic vinyl monomer, and, thereby, a terminal modified group is produced. In this case, it is sufficient that the compound having the reactable functional group at the active terminal of the active conjugated diene polymer chain be attached to at least one active conjugated diene polymer chain, and one or more active conjugated diene polymer chains can be attached to each compound. That is, the modified conjugated diene polymer rubber used in the present technology can include modified rubbers having modifying groups at both terminals of the conjugated diene polymer, modified rubbers in which one or more of the modifying groups is optionally attached to a different conjugated diene polymer, and mixtures of a plurality of these modified rubbers. Additionally, the reaction between the active terminal of the active conjugated diene polymer chain and the compound having the functional group that is reactable with the active terminal can be a single-stage or multiple-stage reaction. Moreover, an identical or different compound may be sequentially reacted.

In the present technology, examples of the compound having the functional group that is reactable with the active terminal of the active conjugated diene polymer chain include tin compounds, silicon compounds, silane compounds, amido compounds and/or imide compounds, isocyanate and/or isothiocyanate compounds, ketone compounds, ester compounds, vinyl compounds, oxirane compounds, thiirane compounds, oxetane compounds, polysulfide compounds, polysiloxane compounds, polyorganosiloxane compounds, polyether compounds, polyene compounds, halogen compounds, and compounds having fullerenes. Among these, polyorganosiloxane compounds are preferable. One of these compounds or combinations of a plurality of these compounds can be attached to the polymer.

Specific examples of the compound having a functional group that is reactable with the active terminal of the active conjugated diene polymer chain include polyglycidyl ethers of polyhydric alcohols such as ethylene glycol diglycidyl ether, glycerin triglycidyl ether, and the like; polyglycidyl ethers of aromatic compounds having two or more phenol groups such as bisphenol A diglycidylate and the like; poly-epoxy compounds such as 1,4-diglycidyl benzene, 1,3,5-triglycidyl benzene, liquid polybutadiene polyepoxydate, and the like; epoxy group-containing tertiary amines such as 4,4'-diglycidyl-diphenyl methylamine, 4,4'-diglycidyl-dibenzyl methylamine, and the like; diglycidyl amino compounds such as diglycidyl aniline, diglycidyl-o-toluidine, tetraglycidyl metaxylylene diamine, tetraglycidyl amino diphenyl-methane, tetraglycidyl-p-phenylenediamine, diglycidyl amino methylcyclohexane, tetraglycidyl-1,3-bis amino methylcyclohexane, and the like; and the like.

Examples of the silicon compound include tetrachlorosilicon, tetrabromosilicon, methyltrichlorosilicon, butyltrichlorosilicon, dichlorosilicon, bis(trichlorosilyl)silicon, and the like.

Examples of the tin compound include tetrachlorostannate, tetrabromostannate, methyltrichlorostannate, butyltrichlorostannate, dichlorostannate, bis(trichlorosilyl)stannate, bis(trichlorosilyl)stannate, and the like.

Examples of the silane compound include silane compounds having at least one selected from an alkoxy group, a phenoxy group, and a halogen. Examples of such silane compounds include dimethoxy dimethylsilane, diphenoxy dimethylsilane, diethoxy diethylsilane, triphenoxy methylsilane, triphenoxy vinylsilane, trimethoxy vinylsilane, triethoxy vinylsilane, tri(2-methylbutoxy)ethylsilane, tri(2-methylbutoxy)vinylsilane, triphenoxy phenylsilane, tetraphenoxysilane, tetraethoxysilane, tetramethoxysilane, tetrakis(2-ethylhexyloxy)silane, phenoxydivinyl chlorosilane, methoxybiethyl chlorosilane, diphenoxymethyl chlorosilane, diphenoxyphenyl iodosilane, diethoxymethyl chlorosilane, dimethoxymethyl chlorosilane, trimethoxy chlorosilane, triethoxy chlorosilane, triphenoxy chlorosilane, tris(2-ethylhexyloxy)chlorosilane, phenoxymethyl dichlorosilane, methoxyethyl dichlorosilane, ethoxymethyl dichlorosilane, phenoxyphenyl diiodosilane, diphenoxy dichlorosilane, dimethoxy dichlorosilane, bis(2-methylbutoxy)dibromosilane, bis(2-methylbutoxy)dichlorosilane, diethoxy dichlorosilane, methoxy trichlorosilane, ethoxy trichlorosilane, phenoxy trichlorosilane, (2-ethylhexyloxy)trichlorosilane, (2-methylbutoxy)trichlorosilane, and the like.

Additionally, aside from the functional groups described above, the silane compound can have a glycidyl group, an epoxy group, a methacryloxy group, and the like. Examples of such silane compounds include γ-glycidoxyethyl trimethoxysilane, γ-glycidoxypropyl trimethoxysilane, γ-glycidoxybutyl trimethoxysilane, γ-glycidoxypropyl triethoxysilane, γ-glycidoxypropyl tripropoxysilane, γ-glycidoxypropyl tributoxysilane, γ-glycidoxypropyl triphenoxysilane, γ-glycidoxypropyl methyldimethoxysilane, γ-glycidoxypropyl ethyldimethoxysilane, γ-glycidoxypropyl ethyldiethoxysilane, γ-glycidoxypropyl methyldiethoxysilane, γ-glycidoxypropyl methyldipropoxysilane, γ-glycidoxypropyl methyldibutoxysilane, γ-glycidoxypropyl methyldiphenoxysilane, γ-glycidoxypropyl dimethylmethoxysilane, γ-glycidoxypropyl diethylethoxysilane, γ-glycidoxypropyl dimethylethoxysilane, γ-glycidoxypropyl dimethylphenoxysilane, γ-glycidoxypropyl diethylmethoxysilane, γ-glycidoxypropyl methyldiisopropeneoxysilane, bis(γ-glycidoxypropyl)dimethoxysilane, bis(γ-glycidoxypropyl)diethoxysilane, bis(γ-glycidoxypropyl)dipropoxysilane, bis(γ-glycidoxypropyl)dibutoxysilane, bis(γ-glycidoxypropyl)diphenoxysilane, bis(γ-glycidoxypropyl)methylmethoxysilane, bis(γ-glycidoxypropyl)methylethoxysilane, bis(γ-glycidoxypropyl)methylpropoxysilane, bis(γ-glycidoxypropyl)methylbutoxysilane, bis(γ-glycidoxypropyl)methylphenoxysilane, tris(γ-glycidoxypropyl)methoxysilane, γ-methacryloxypropyl trimethoxysilane, γ-methacryloxypropyl triethoxysilane, γ-methacryloxymethyl trimethoxysilane, γ-methacryloxyethyl triethoxysilane, bis(γ-methacryloxypropyl)dimethoxysilane, tris(γ-methacryloxypropyl)methoxysilane, β-(3,4-epoxycyclohexyl)ethyl-trimethoxysilane, β-(3,4-epoxycyclohexyl)ethyl-triethoxysilane, β-(3,4-epoxycyclohexyl)ethyl-tripropoxysilane, β-(3,4-epoxycyclohexyl)ethyl-tributoxysilane, β-(3,4-epoxycyclohexyl)ethyl-triphenoxysilane, β-(3,4-epoxycyclohexyl)propyl-trimethoxysilane, β-(3,4-epoxycyclohexyl)ethyl-methyldimethoxysilane, β-(3,4-epoxycyclohexyl)ethyl-ethyldimethoxysilane, β-(3,4-epoxycyclohexyl)ethyl-ethyldiethoxysilane, β-(3,4-epoxycyclohexyl)ethyl-methyldiethoxysilane, β-(3,4-epoxycyclohexyl)ethyl-methyldipropoxysilane, β-(3,4-epoxycyclohexyl)ethyl-methyldibutoxysilane, β-(3,4-epoxycyclohexyl)ethyl-methyldiphenoxysilane, β-(3,4-epoxycyclohexyl)ethyl-dimethylmethoxysilane, β-(3,4-epoxycyclohexyl)ethyl-diethylethoxysilane, β-(3,4-epoxycyclohexyl)ethyl-dimethylethoxysilane, β-(3,4-epoxycyclohexyl)ethyl-dimethylpropoxysilane, β-(3,4-epoxycyclohexyl)ethyl-dimethylbutoxysilane, β-(3,4-epoxycyclohexyl)ethyl-dimethylphenoxysilane, β-(3,4-epoxycyclohexyl)ethyl-diethylmethoxysilane, β-(3,4-epoxycyclohexyl)ethyl-methyldiisopropeneoxysilane, and the like.

Examples of the isocyanate compound or isothiocyanate compound include aromatic polyisocyanate compounds such as 2,4-tolylene diisocyanate, 2,6-tolylene diisocyanate, diphenylmethane diisocyanate, naphthalene diisocyanate, tolidine diisocyanate, triphenylmethane triisocyanate, p-phenylene diisocyanate, tris(isocyanatephenyl)thiophosphate, xylylene diisocyanate, benzene-1,2,4-triisocyanate, naphthalene-1,2,5,7-tetraisocyanate, naphthalene-1,3,7-triisocyanate, phenylisocyanate, hexamethylene diisocyanate, methylcyclohexane diisocyanate, phenyl-1,4-diisothiocyanate, 2,4-tolylene diisocyanate, diphenylmethane diisocyanate, naphthalene diisocyanate, and the like.

Further examples include N-substituted aminoketones such as 4-dimethylamino benzophenone, 4-diethylamino benzophenone, 4-di-t-butylamino benzophenone, 4-diphenylamino benzophenone, 4,4'-bis(dimethylamino)benzophenone, 4,4'-bis(diethylamino)benzophenone, 4,4'-bis(di-t-butylamino)benzophenone, 4,4'-bis(diphenylamino)benzophenone, 4,4'-bis(divinylamino)benzophenone, 4-dimethylamino acetophenone, 4-diethylamino acetophenone, 1,3-bis(diphenylamino)-2-propanone, 1,7-bis(methylethylamino)-4-heptanone, and the like and corresponding N-substituted aminothioketones; N-substituted aminoaldehydes such as 4-diethylamino benzaldehyde, 4-divinylamino benzaldehyde, and the like and corresponding N-substituted aminothioaldehydes; N-substituted lactams such as N-methyl-β-propiolactam, N-t-butyl-β-propiolactam, N-phenyl-β-propiolactam, N-methoxyphenyl-β-propiolactam, N-naphthyl-β-propiolactam, N-methyl-2-pyrrolidone, N-t-butyl-2-pyrrolidone, N-phenyl-pyrrolidone, N-methoxyphenyl-2-pyrrolidone, N-vinyl-2-pyrrolidone, N-benzyl-2-pyrrolidone, N-naphthyl-2-pyrrolidone, N-methyl-5-methyl-2-pyrrolidone, N-methyl-3,3'-dimethyl-2-pyrrolidone, N-t-butyl-3,3'-dimethyl-2-pyrrolidone, N-phenyl-3,3'-dimethyl-2-pyrrolidone, N-methyl-2-piperidone, N-t-butyl-2-piperidone, N-phenyl-piperidone, N-methoxyphenyl-2-piperidone, N-vinyl-2-piperidone, N-benzyl-2-piperidone, N-naphthyl-2-piperidone, N-methyl-3,3'-dimethyl-2-piperidone, N-phenyl-3,3'-dimethyl-2-piperidone, N-methyl-ε-caprolactam, N-phenyl-ε-caprolactam, N-methoxyphenyl-ε-caprolactam, N-vinyl-ε-caprolactam, N-benzyl-ε-caprolactam, N-naphthyl-ε-caprolactam, N-methyl-ω-laurilolactam, N-phenyl-ω-laurilolactam, N-t-butyl-laurilolactam, N-vinyl-ω-laurilolactam, N-benzyl-ω-laurilolactam, and the like and corresponding thiolactams; N-substituted ethyleneureas such as 3-dimethyl-2-imidazolidinone, 1,3-diethyl-2-imidazolidinone, 1,3-dipropyl-2-imidazolidinone, 1-methyl-3-ethyl-2-imidazolidinone, 1-methyl-3-propyl-2-imidazolidinone, 1-methyl-3-methyl-2-imidazolidinone, 1-methyl-3-2-ethoxyethyl-2-imidazolidinone, 1,3-dimethyl-3,4,5,6-tetrahydropyrimidinone, and the like and corresponding N-substituted thioethyleneureas and the like; benzophenones and thiobenzophenones having at least one amino group, alkylamino group or dialkylamino group on one or both benzene rings such as 4,4'-bis(dimethylamino)-benzophenone, 4,4'-bis(diethylamino)-benzophenone, 4,4'-bis(dibutylamino)-benzophenone, 4,4'-diamino benzophenone, 4-dimethylamino benzophenone, and the like and corresponding thiobenzophenones and the like; and the like.

The halogen and/or alkoxy group-containing silicon compound preferably is a compound expressed by general formula (IV) below. A plurality of active conjugated diene polymer chains can easily be attached to a molecule of this compound.

Formula 4

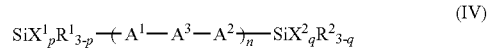

(IV)

In formula (IV), $X^1$ and $X^2$ are halogen atoms or alkoxy groups having from 1 to 20 carbons. p and q are each independently integers from 0 to 3 and the total number of halogen atoms and alkoxy groups having from 1 to 20 carbons in the compound expressed by formula (IV) is not less than 5. $R^1$ and $R^2$ are each monovalent hydrocarbon groups having from 1 to 20 carbons. n is an integer of from 0 to 20 and $A^1$ and $A^2$ are each independently divalent hydrocarbons having a single bond or from 1 to 20 carbons. $A^3$ is a divalent group expressed by the formula —$(SiX^3_r R^3_{2-r})_m$—, —$NR^4$—, or —$N(-A^4-SiX^4_s R^5_{3-s})$—. $X^3$ and $X^4$ are halogen atoms or alkoxy groups having from 1 to 20 carbons. $R^3$ and $R^5$ are monovalent hydrocarbon groups having from 1 to 20 carbons. $R^4$ is a hydrogen atom or a monovalent hydrocarbon group having from 1 to 20 carbons. $A^4$ is a divalent hydrocarbon group having a single bond or from 1 to 20 carbons. r is an integer of from 0 to 2 and m is an integer of from 0 to 20. s is an integer of from 0 to 3.

Examples of the compound expressed by general formula (IV) include halogenated silicon compounds such as hexachlorodisilane, bis(trichlorosilyl)methane, 1,2-bis(trichlorosilyl)ethane, 1,3-bis(trichlorosilyl)propane, 1,4-bis(trichlorosilyl)butane, 1,5-bis(trichlorosilyl)pentane, 1,6-bis(trichlorosilyl)hexane, and the like; alkoxysilane compounds such as hexamethoxydisilane, hexaethoxydisilane, bis(trimethoxysilyl)methane, bis(triethoxysilyl)methane, bis(trimethoxysilyl)ethane, bis(triethoxysilyl)ethane, bis(trimethoxysilyl)propane, bis(triethoxysilyl)propane, bis(trimethoxysilyl)butane, bis(triethoxysilyl)butane, bis(trimethoxysilyl)heptane, bis(triethoxysilyl)heptane, bis(trimethoxysilyl)hexane, bis(triethoxysilyl)hexane, bis(trimethoxysilyl)benzene, bis(triethoxysilyl)benzene, bis(trimethoxysilyl)cyclohexane, bis(triethoxysilyl)cyclohexane, bis(triethoxysilyl)benzene, bis(trimethoxysilyl)octane, bis(triethoxysilyl)octane, bis(trimethoxysilyl)nonane, bis(triethoxysilyl)nonane, bis(trimethoxysilyl)ethylene, bis(triethoxysilyl)ethylene, bis(trimethoxysilylethyl)benzene, bis(triethoxysilylethyl)benzene, bis(3-trimethoxysilylpropyl)ethane, bis(3-triethoxysilylpropyl)ethane, and the like; alkoxysilane compounds having an amino group such as bis(3-trimethoxysilylpropyl)methylamine, bis(3-triethoxysilylpropyl)methylamine, bis(3-trimethoxysilylpropyl)ethylamine, bis(3-triethoxysilylpropyl)ethylamine, bis(3-trimethoxysilylpropyl)propylamine, bis(3-triethoxysilylpropyl)propylamine, bis(3-trimethoxysilylpropyl)butylamine, bis(3-triethoxysilylpropyl)butylamine, bis(3-trimethoxysilylpropyl)phenylamine, bis(3-triethoxysilylpropyl)phenylamine, bis(3-trimethoxysilylpropyl)benzylamine, bis(3-triethoxysilylpropyl)benzylamine, bis(trimethoxysilylmethyl)methylamine, bis(triethoxysilylmethyl)methylamine, bis(2-trimethoxysilylethyl)methylamine, bis(2-triethoxysilylethyl)methylamine, bis(triethoxysilylmethyl)propylamine, bis(2-triethoxysilylethyl)propylamine, and the like; alkoxysilane compounds having an amino group such as tris(trimethoxysilylmethyl)amine, tris(2-triethoxysilylethyl)amine, tris(3-trimethoxysilylpropyl)amine, tris(3-triethoxysilylpropyl)amine, and the like; and the like.

The polyorganosiloxane compound is preferably a compound expressed by general formulae (I) to (III) below. That is, the compound having the functional group that is reactable with the active terminal of the active conjugated diene polymer chain preferably includes at least one compound selected from these polyorganosiloxane compounds, and may include a combination of a plurality of these compounds. Additionally, these polyorganosiloxane compounds may be combined with another compound having a functional group that is reactable with the active terminal (e.g. the compound expressed by formula (IV) above).

General formula (I)
Formula 5

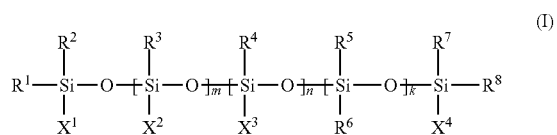

In formula (I), $R^1$ to $R^8$ are identical or different and are alkyl groups having from 1 to 6 carbons or aryl groups having from 6 to 12 carbons; $X^1$ and $X^4$ are identical or different and are groups having functional groups that react with the active terminal of the active conjugated diene polymer chain, alkyl groups having from 1 to 6 carbons, or aryl groups having from 6 to 12 carbons; $X^2$ is a group having a functional group that reacts with the active terminal of the active conjugated diene polymer chain; $X^3$ is a group including from 2 to 20 repeating alkylene glycol units, a portion of the $X^3$ moieties optionally being groups derived from groups including from 2 to 20 repeating alkylene glycol units; and m is an integer from 3 to 200, n is an integer from 0 to 200, and k is an integer from 0 to 200.

General formula (II)
Formula 6

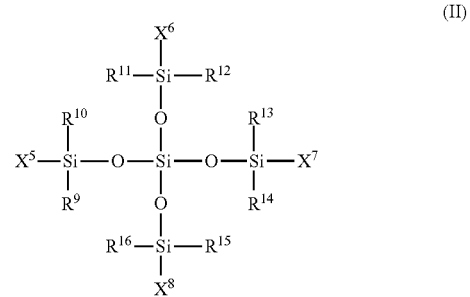

In formula (II), $R^9$ to $R^{16}$ are identical or different and are alkyl groups having from 1 to 6 carbons or aryl groups having from 6 to 12 carbons; and $X^5$ to $X^8$ are groups having functional groups that react with the active terminal of the active conjugated diene polymer chain.

General formula (III)
Formula 7

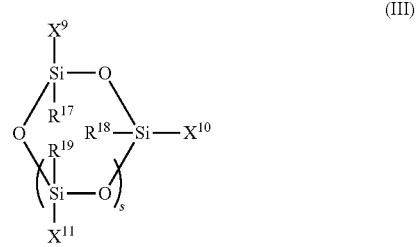

In formula (III), $R^{17}$ to $R^{19}$ are identical or different and are alkyl groups having from 1 to 6 carbons or aryl groups having from 6 to 12 carbons; and $X^9$ to $X^{11}$ are groups having functional groups that react with the active terminal of the active conjugated diene polymer chain; and s is an integer from 1 to 18.

Examples of the alkyl groups having from 1 to 6 carbons that constitute the $R^1$ to $R^8$, $X^1$, and $X^4$ moieties in the polyorganosiloxane expressed by general formula (I) above include methyl groups, ethyl groups, n-propyl groups, isopropyl groups, butyl groups, pentyl groups, hexyl groups, cyclohexyl groups, and the like. Examples of the aryl groups having from 6 to 12 carbons include phenyl groups, methylphenyl groups, and the like. Among these alkyl groups and aryl groups, methyl groups are particularly preferable.

Examples of the group having the functional group, which reacts with the active terminal of the polymer chain, constituting the $X^1$, $X^2$, and $X^4$ moieties in the polyorganosiloxane expressed by general formula (I) include alkoxyl groups having from 1 to 5 carbons, hydrocarbon groups containing a 2-pyrrolidonyl group, and epoxy group-containing groups having from 4 to 12 carbons.

Examples of the alkoxyl groups having from 1 to 5 carbons constituting the $X^1$, $X^2$, and $X^4$ moieties include methoxy groups, ethoxy groups, propoxy groups, isopropoxy groups, butoxy groups, and the like. Among these, methoxy groups are preferable. In cases where at least one of the $X^1$, $X^2$, and $X^4$ moieties is the alkoxyl group having from 1 to 5 carbons, when the polyorganosiloxane having the alkoxyl group is reacted with the active terminal of the active conjugated diene polymer chain, linkage between the silicon atom and the oxygen atom of the alkoxyl group breaks and the active conjugated diene polymer chain attaches directly to the silicon atom, thus forming a single bond.

Preferable examples of the hydrocarbon group containing a 2-pyrrolidonyl group constituting the $X^1$, $X^2$, and $X^4$ moieties include the groups expressed by the general formula (V) below.

Formula 8

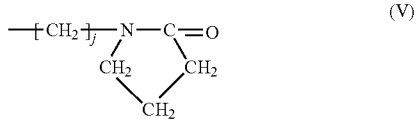

(V)

In formula (V), j is an integer of from 2 to 10, and j is particularly preferably 2.

Thus, when the polyorganosiloxane, in which at least one of the $X^1$, $X^2$, and $X^4$ moieties comprises the hydrocarbon group containing the 2-pyrrolidonyl group, is reacted with the active terminal of the active conjugated diene polymer chain, the carbon-oxygen bond in the carbonyl group constituting the 2-pyrrolidonyl group breaks and a structure is formed in which the polymer chain is bonded to the carbon atom.

Preferable examples of the epoxy group-containing group having from 4 to 12 carbons constituting the $X^1$, $X^2$, and $X^4$ moieties include the groups expressed by the general formula (VI) below.

General Formula (VI): ZYE

In formula (VI), Z is an alkylene group or an alkyl arylene group having from 1 to 10 carbons; Y is a methylene group, a sulfur atom, or an oxygen atom; and E is an epoxy group-containing hydrocarbon group having from 2 to 10 carbons. Among these, preferably Y is an oxygen atom; more preferably Y is an oxygen atom and E is a glycidyl group; and even more preferably Z is an alkylene group having three carbons, Y is an oxygen atom, and E is a glycidyl group.

In the polyorganosiloxane expressed by general formula (I), in cases where at least one of the $X^1$, $X^2$, and $X^4$ moieties is an epoxy group-containing group having from 4 to 12 carbons, when the polyorganosiloxane is reacted with the active terminal of the active conjugated diene polymer chain, the carbon-oxygen bond forming the epoxy ring breaks and a structure is formed in which the polymer chain is bonded to the carbon atom.

In the polyorganosiloxane expressed by general formula (I), of the above, $X^1$ and $X^4$ are preferably epoxy group-containing groups having from 4 to 12 carbons or alkyl group having from 1 to 6 carbons. Additionally, $X^2$ is preferably an epoxy group-containing group having from 4 to 12 carbons.

In the polyorganosiloxane expressed by general formula (I), $X^3$ is a group including from 2 to 20 repeating alkylene glycol units. Preferable examples of the group including from 2 to 20 repeating alkylene glycol units include the group expressed by general formula (VII) below.

Formula 9

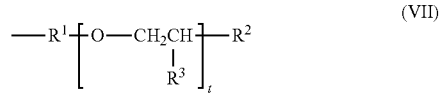

(VII)

In formula (VII), t is an integer of from 2 to 20, $R^1$ is an alkylene group or an alkyl arylene group having from 2 to 10 carbons, $R^3$ is a hydrogen atom or a methyl group, and $R^2$ is an alkoxyl group or an aryloxy group having from 1 to 10 carbons. Among these, preferably, t is an integer of from 2 to 8, $R^1$ is an alkylene group having three carbons, $R^3$ is a hydrogen atom, and $R^2$ is a methoxy group.

In the polyorganosiloxane expressed by general formula (II), $R^9$ to $R^{16}$ are identical or different and are alkyl groups having from 1 to 6 carbons or aryl groups having from 6 to 12 carbons. $X^5$ to $X^8$ are groups having functional groups that react with the active terminal of the polymer chain.

In the polyorganosiloxane expressed by general formula (III), $R^{17}$ to $R^{19}$ are identical or different and are alkyl groups having from 1 to 6 carbons or aryl groups having from 6 to 12 carbons. $X^9$ to $X^{11}$ are groups having functional groups that react with the active terminal of the polymer chain. s is an integer from 1 to 18.

In the polyorganosiloxane expressed by general formula (II) and general formula (III) above, the alkyl group having from 1 to 6 carbons, the aryl group having from 6 to 12 carbons, and the group having the functional group that reacts with the active terminal of the polymer chain are synonymous with those recited for the polyorganosiloxane expressed by general formula (I).

Furthermore, the terminal modified group produced as a result of the reaction described above has a functional group that interacts with silica. This functional group that interacts with silica may be the functional group included in the structure of the compound described above. The functional group may also be a functional group that is obtained as a result of the reaction between the compound and the active terminal. The functional group that interacts with silica is not particularly limited, and examples thereof include an alkoxysilyl group, a hydroxyl group (including those having organosiloxane structures), an aldehyde group, a carboxyl group, an amino group, an imino group, an epoxy group, an amido group, a thiol group, an ether group, and the like. Among these, the hydroxyl group (including that having an organosiloxane structure) is preferable. Thus, the terminal modified group includes the functional group that interacts with silica and, therefore, affinity with silica is further enhanced, which leads to significant improvement in dispersibility.

In the present technology, the concentration of the terminal modified group in the modified conjugated diene polymer rubber is determined by its relationship to the weight-average molecular weight (Mw) of the modified conjugated diene polymer rubber. The weight-average molecular weight of the modified conjugated diene polymer rubber is from 600,000 to 1,000,000 and is preferably from 650,000 to 850,000. For example, it is from 650,000 to 750,000, or from 750,000 to 850,000. If the weight-average molecular weight of the modified conjugated diene polymer rubber is less than 600,000, the concentration of the terminal modified group of the modified conjugated diene polymer rubber will increase and, while the dispersibility of the silica in the rubber composition will be better, but because the molecular weight of the polymer itself will be low, the effects of improving the strength and rigidity will not be obtained, wear resistance will be unsatisfactory, and the degree of improvement in viscoelastic characteristics will be limited. If the weight-average molecular weight of the modified conjugated diene polymer rubber exceeds 1,000,000, the concentration of the terminal modified group of the modified conjugated diene polymer rubber will decrease, affinity with the silica will be insufficient, and dispersibility will be negatively affected. As a result, the effects of reducing the rolling resistance will be insufficient and the wet performance will be insufficient. Additionally, at the same time, the rigidity and the strength of the rubber composition will decline. Note that the weight-average molecular weight (Mw) of the modified conjugated diene polymer rubber is measured via gel permeation chromatography (GPC), in terms of standard polystyrene.

An aromatic vinyl unit content in the modified conjugated diene polymer rubber used in the present technology is from 38% to 48% by weight and preferably from 40% to 45% by weight. For example, it is from 40% to 41% by weight, or from 41% to 42% by weight, or from 42% to 45% by weight. By configuring the aromatic vinyl unit content in the modified conjugated diene polymer rubber to be within this range, wet performance and wear resistance can both be obtained when the rubber is formed into a pneumatic tire. When compounding a diene rubber other than the modified conjugated diene polymer rubber, the modified conjugated diene polymer rubber takes on a fine phase-separated form from the other diene rubber. As a result, the modified conjugated diene polymer rubber gathers locally in the vicinity of the silica particles and the terminal modified groups act effectively on the silica, which leads to the affinity being further enhanced and the dispersibility of the silica being excellent. If the aromatic vinyl unit content in the modified conjugated diene polymer rubber is less than 38% by weight, the acting of forming the fine phase-separated form from the other diene rubber cannot be sufficiently obtained. Additionally, the effects of increasing the rigidity and the strength of the rubber composition cannot be sufficiently obtained. If the aromatic vinyl unit content in the modified conjugated diene polymer rubber exceeds 48% by weight, the glass transition temperature (Tg) of the conjugated diene polymer rubber will rise, the balance between viscoelastic characteristics will worsen, and it will be difficult to obtain the effects of reducing heat build-up. Note that the aromatic vinyl unit content in the modified conjugated diene polymer rubber is measured using infrared emission spectroscopy (Hampton technique).

In the present technology, a vinyl unit content in the modified conjugated diene polymer rubber is from 20% to 35% by weight and is preferably from 26% to 34% by weight. For example, it is from 26% to 32% by weight, or from 32% to 34% by weight. Note that in this specification, when it is simply referred to as "vinyl unit", it means a conjugated diene unit. The glass transition temperature (Tg) of the modified conjugated diene polymer rubber can be made appropriate by configuring the vinyl unit content in the modified conjugated diene polymer rubber to be from 20% to 35% by weight. Additionally, in this case, the fine phase-separated form of the modified conjugated diene polymer rubber from the other diene rubber can be stabilized. If the vinyl unit content in the modified conjugated diene polymer rubber is less than 20% by weight, Tg of the modified conjugated diene polymer rubber will decrease and the dynamic visco-elasticity characteristic loss tangent (tan δ) at 0° C., which is the indicator of wet performance, will decline. Moreover, in this case, the fine phase-separated form of the modified conjugated diene polymer rubber cannot be stabilized. If the vinyl unit content in the modified conjugated diene polymer rubber exceeds 35% by weight, there is a possibility that vulcanization rate will decline and the strength and the rigidity will decline. Note that the vinyl unit content in the modified conjugated diene polymer rubber is measured using infrared emission spectroscopy (Hampton technique).

The forming processability of a rubber composition can be enhanced by oil extending the modified conjugated diene polymer rubber. The amount of oil extension is not particularly limited, but is preferably not more than 25 parts by weight per 100 parts by weight of the modified conjugated diene polymer rubber. If the amount of oil extension of the modified conjugated diene polymer rubber exceeds 25 parts by weight, the degree of freedom in formulation design when compounding oils, softeners, tackifiers, and the like in the rubber composition will be limited.

Additionally, the glass transition temperature (Tg) of the modified conjugated diene polymer rubber is not particularly limited, but is preferably configured to be from −30° C. to −15° C. By configuring the Tg of the modified conjugated diene polymer rubber to be within this range, the steering stability can be ensured and the rolling resistance can be reduced. Additionally, by configuring the Tg to be within this range, the wet grip performance can be ensured. The glass transition temperature (Tg) of the modified conjugated diene polymer rubber is measured using a thermograph by differential scanning calorimetry (DSC) at a temperature elevation speed of 20° C./minute. The temperature at the midpoint of the transition region is set as the glass transition temperature thereof. Additionally, when the modified conjugated diene polymer rubber is an oil extended product, the glass transition temperature is the glass transition temperature of the modified conjugated diene polymer rubber in a state where the oil extension component (the oil) is not included.

In the present technology, the content of the modified conjugated diene polymer rubber is from 35% to 89% by weight of the diene rubber, and is preferably from 40% to 85% by weight. For example, it is from 40% to 45% by weight, or from 45% to 75% by weight, or from 75% to 85% by weight. If the content of the modified conjugated diene polymer rubber is less than 35% by weight of the diene rubber, affinity with the silica will worsen, and dispersibility of the silica cannot be made excellent. Furthermore, if the content of modified conjugated diene polymer rubber exceeds 89% by weight, wear resistance will decrease because the glass transition temperature of the rubber composition will rise.

The rubber composition for use in tire treads of the present technology comprises a butadiene rubber, and as a result, the wear resistance can be improved while maintaining the low rolling resistance and the wet performance at high levels. The compounded amount of the butadiene rubber is configured to be from 11% to 40% by weight in the diene rubber, and preferably from 15% to 35% by weight. For example, it is from 15% to 30% by weight, or from 30% to 35% by weight. If the compounded amount of butadiene rubber is less than 11% by weight, good wear resistance cannot be obtained. Additionally, if the compounded amount of the butadiene rubber exceeds 40% by weight, wet grip performance will decline. Any butadiene rubber that is regularly used in rubber compositions for use in tires may be used.

In the present technology, a diene rubber other than the modified conjugated diene polymer rubber (first modified conjugated diene polymer rubber) and the butadiene rubber can be compounded as a rubber component. Examples of the other diene rubber include natural rubber, isoprene rubber, solution polymerization styrene butadiene rubber (S-SBR), emulsion polymerization styrene butadiene rubber (E-SBR), butyl rubber, halogenated butyl rubber, and the like. The other diene rubber is preferably a natural rubber, an isoprene rubber, a solution polymerization styrene butadiene rubber, or an emulsion polymerization styrene butadiene rubber. Here, solution polymerization styrene butadiene rubber may be selected from terminal-unmodified solution polymerization styrene butadiene rubbers and terminal-modified solution polymerization styrene butadiene rubbers other than the modified conjugated diene polymer rubber of the present technology (second modified conjugated diene polymer rubber). A single rubber may be used or multiple rubbers may be blended and used as the diene rubber. The content of the other diene rubber is not more than 54% by weight of the diene rubber, and is preferably not more than 40% by weight. For example, it is from 1% to 25% by weight, or from 25% to 40% by weight. The upper limit of content of the other diene rubber is not particularly limited, but is, for example, 1% by weight.

With the rubber composition for use in tire treads of the present technology, due to the compounding of the aromatic modified terpene resin, the wet performance, particularly, the steering stability on wet road surfaces, can be further improved while maintaining the low rolling resistance. The aromatic modified terpene resin has a softening point of from 100° C. to 150° C., and preferably from 110° C. to 140° C. For example, it is from 110° C. to 125° C., or from 125° C. to 140° C. If the softening point of the aromatic modified terpene resin is lower than 100° C., the effects of improving the wet performance cannot be sufficiently obtained. If the softening point of the aromatic modified terpene resin exceeds 150° C., the dispersibility in the diene rubber will be negatively affected, the grip performance on wet road surfaces will decline, and the rubber strength will decline. Note that the softening point of the aromatic modified terpene resin is measured according to JIS K 6220-1 (ball and ring method).

The compounded amount of aromatic modified terpene resin is from 3 to 60 parts by weight per 100 parts by weight of diene rubber, and the ratio Wte/Wbr of the compounded amount of aromatic modified terpene resin Wte to the compounded amount of butadiene rubber Wbr is from 0.5 to 1.3, preferably from 0.8 to 1.1. For example, it is configured to be from 0.5 to 0.8, or from 0.8 to 1.3. If the ratio Wte/Wbr is less than 0.5, the effect of improving wet grip performance will not be sufficiently obtained because the glass transition temperature of the rubber composition will decrease. If the ratio Wte/Wbr exceeds 1.3, not only will rolling resistance and wear resistance worsen, but tackiness of the rubber composition will increase, and forming processability and handling will worsen, such as by sticking to the molding roller. Furthermore, the compounded amount of the aromatic modified terpene resin is configured to be, for example, from 3 to 12 parts by weight, or from 12 to 40 parts by weight, or from 40 to 60 parts by weight, relative to 100 parts by weight of the diene rubber.

The aromatic modified terpene resin is obtained by polymerizing a terpene and an aromatic compound. Examples of the terpene include α-pinene, β-pinene, dipentene, limonene, and the like. Examples of the aromatic compound include styrene, α-methylstyrene, vinyl toluene, indene, and the like. Among these, styrene modified terpene resins are preferable as the aromatic modified terpene resin. Such aromatic modified terpene resins increase tan δ at 0° C. of the rubber composition and enhance wet grip performance due to excellent compatibility with the diene rubber.

A hydroxyl value of the aromatic modified terpene resin is preferably 30 KOH mg/g or less and more preferably from 0 to 25 KOH mg/g. The tan δ at 0° C. increases and wet grip performance is enhanced by configuring the hydroxyl value of the aromatic modified terpene resin to be 30 KOH mg/g or less. Note that the hydroxyl value of the aromatic modified terpene resin is measured in accordance with JIS K1557-1.

In the present technology, the compounded amount of the filler containing from 70% to 95% by weight of silica is from 100 to 150 parts by weight, for example, from 100 to 120 parts by weight, or from 120 to 130 parts by weight, or from 130 to 150 parts by weight, per 100 parts by weight of the diene rubber. By configuring the compounded amount of the filler to be within this range, the low rolling resistance and wet performance of the rubber composition can be balanced at higher levels. If the compounded amount of the filler is less than 100 parts by weight, wet performance decreases. If the compounded amount of the filler exceeds 150 parts by weight, heat build-up increases and low rolling resistance is negatively affected.

The content of the silica in 100% by weight of the filler is not less than 70% by weight and is preferably from 80% to 100% by weight. For example, it is configured to be from 80% to 92% by weight, or from 92% to 100% by weight. By configuring the content of the silica in the filler to be within this range, the low rolling resistance and wet performance of the rubber composition can be balanced at higher levels. Furthermore, by compounding the modified conjugated diene polymer rubber, affinity with silica is increased, and dispersibility is improved. As a result, the effects of the silica are further enhanced.

In the present technology, a certain silica 1 may be used alone as the silica, or the certain silica 1 may be used together with another silica. The certain silica 1 preferably has a DBP absorption number of from 185 to 250 mL/100 g, and a ratio ($N_2SA$/CTAB) of nitrogen adsorption specific surface area ($N_2SA$) to CTAB specific surface area (CTAB) of from 0.90 to 1.25. The compounded quantity of silica 1 is preferably from 70% to 100% by weight of the total amount of silica.

By compounding silica 1 only or at least two types of silica including silica 1 in the rubber composition for use in tire treads of the present technology, low rolling resistance, wet performance and wear resistance can be balanced at a high level while keeping the compounded amount of filler high, that is from 100 to 150 parts by weight, and the compounded amount of silica to be not less than 70% by weight in 100% by weight of the filler.

The compounded amount of silica 1 is preferably not less than 70% by weight and more preferably from 80% to 100% by weight of the diene rubber. For example, it is from 70% to 75% by weight, or from 75% to 83% by weight, or from 83% to 100% by weight. If the compounded amount of silica 1 is less than 70% by weight, wear resistance will decrease due to a decrease in rubber strength.

The DBP absorption number of silica 1 is preferably from 185 to 250 mL/100 g. For example, it is from 185 to 200 mL/100 g, or from 200 to 250 mL/100 g. If the DBP absorption number is less than 185 mL/100 g, wear resistance will worsen because fracture strength will decrease. If the DBP absorption number exceeds 250 mL/100 g, the heat build-up and rolling resistance will worsen. The DBP absorption number of the silica is calculated in accordance with the Oil Absorption Number Method A described in JIS K6217-4.

Furthermore, the ratio ($N_2SA/CTAB$) of $N_2SA$ to CTAB of silica 1 is preferably from 0.90 to 1.25, and more preferably from 0.95 to 1.20. For example, it is configured to be from 0.95 to 1.01, or from 1.01 to 1.20. If the characteristic ratio of the silica ($N_2SA/CTAB$) is less than 0.90, reinforcement action will decline. Also, if the characteristic ratio of the silica ($N_2SA/CTAB$) exceeds 1.25, dispersibility of the silica will decrease, and rolling resistance and wet performance will worsen. Here, the $N_2SA$ of the silica is determined according to JIS K 6217-2. The CTAB of the silica is determined according to JIS K6217-3.

The silica may be any silica that is regularly used in rubber compositions for use in tire treads. Examples thereof include wet method silica, dry method silica, surface treated silica, and the like.

In the rubber composition of the present technology, a silane coupling agent is preferably compounded together with the silica as such will lead to an improvement in the dispersibility of the silica and a further increase in the reinforcement action of the diene rubber. A compounded amount of the silane coupling agent is preferably from 3% to 20% by weight and more preferably from 5% to 15% by weight of the compounded amount of the silica. For example, it is from 5% to 10% by weight, or from 10% to 15% by weight. If the compounded amount of the silane coupling agent is less than 3% by weight of the weight of the silica, the effect of improving the dispersion of the silica cannot be sufficiently obtained. Additionally, if the compounded amount of the silane coupling agent exceeds 20% by weight, the silane coupling agents will polymerize, and the desired effects cannot be obtained.

The silane coupling agent is not particularly limited, but is preferably a sulfur-containing silane coupling agent. Examples thereof include bis-(3-triethoxysilylpropyl)tetrasulfide, bis(3-triethoxysilylpropyl)disulfide, 3-trimethoxysilylpropyl benzothiazole tetrasulfide, γ-mercaptopropyltriethoxysilane, 3-octanoylthiopropyl triethoxysilane, and the like.

It is preferred that the nitrogen adsorption specific surface area of the carbon black is from 70 to 165 $m^2/g$. For example, it is from 70 to 77 $m^2/g$, or from 77 to 123 $m^2/g$, or from 123 to 165 $m^2/g$. If the nitrogen adsorption specific surface area of the carbon black is less than 70 $m^2/g$, wear resistance will worsen due to decreased reinforcement action. If it exceeds 165 $m^2/g$, rolling resistance will worsen due to worsened heat build-up of the rubber. Here, $N_2SA$ of the carbon black is determined according to JIS K 6217-2. The compounded amount of the carbon black is not particularly limited, but is, for example, from 10 to 15 parts by weight, from 15 to 20 parts by weight, or from 20 to 60 parts by weight per 100 parts by weight of the diene rubber.

The rubber composition for use in tire treads of the present technology may also include other fillers other than the silica. Examples of such fillers other than the silica include, carbon black, clay, mica, talc, calcium carbonate, aluminum hydroxide, aluminum oxide, titanium oxide, and the like. Among these, carbon black is preferable. This is because rubber strength can be increased by compounding carbon black.

The rubber composition for use in tire treads may also include various compounding agents that are commonly used in rubber compositions for use in tire treads. Examples thereof include vulcanization or cross-linking agents, vulcanization accelerators, antiaging agents, plasticizers, processing aids, liquid polymers, thermosetting resins, and the like. These compounding agents can be kneaded by a common method to obtain a composition that can then be used for vulcanization or cross-linking. These compounding agents can be blended at conventional general amounts so long as the objects of the present technology are not hindered. The rubber composition for use in tire treads can be produced by mixing the above-mentioned components using a well-known rubber kneading machine such as a Banbury mixer, a kneader, an open roll, or the like.

The rubber composition for use in tire treads of the present technology can be advantageously used in pneumatic tires. The low rolling resistance, wet performance and wear resistance can be enhanced to or beyond conventional levels via a pneumatic tire in which the rubber composition described above is used in the tread portion.

The present technology is further described below by examples. However, the scope of the present technology is not limited to these examples.

Working Examples

Thirty-eight types of rubber compositions (Working Examples 1 to 20, Comparative Examples 1 to 18), which consist of the formulations shown in FIGS. 1A to 3D, for use in tire treads were prepared. The shared components shown in FIG. 4 (with the exception of the sulfur and the vulcanization accelerator) were compounded with the rubber compositions, the mixtures were kneaded in a 1.8 L sealed mixer for five minutes at 160° C. Then, the mixtures were extruded as master batches, to which the sulfur and the vulcanization accelerator were added. Thereafter, the master batches were kneaded on an open roll. Note that in FIGS. 1A to 3D, the net compounded amount of each rubber component is shown in parentheses for SBR that contains extension oil. The total filler indicates the total of silica and carbon black (parts by weight); the ratio of silica in filler indicates the silica content (% by weight) in 100% by weight of filler; the ratio of silica 1 in silica indicates the silica 1 content (% by weight) in 100% by weight of all silica; the ratio Wte/Wbr of the compounded amount of aromatic modified terpene resin Wte to the compounded amount of butadiene rubber Wbr indicates each of those, respectively. Additionally, the contents of the shared components shown in FIG. 4 are parts by weight compounded per 100 parts by weight of the diene rubbers shown in FIGS. 1A to 3D.

Vulcanized rubber samples were fabricated by pressure vulcanizing the obtained 38 types of rubber compositions for use in tire treads in a mold having a predetermined shape for 20 minutes at 160° C. Then, the rolling resistance (tan δ at 60° C.) and wear resistance of the samples were measured and evaluated according to the methods described below.

Rolling Resistance: tan δ (60° C.)

The rolling resistance of the obtained vulcanized rubber samples was evaluated based on the loss tangent tan δ (60° C.), which is known as an indicator of rolling resistance. The tan δ (60° C.) was measured using a viscoelasticity spectrometer (manufactured by Toyo Seiki Seisaku-sho, Ltd.) under the following conditions: 10% initial distortion, ±2% amplitude, 20 Hz frequency, and 60° C. temperature. The results of the measuring were indexed and recorded in FIGS. 1A to 3D, with the index value of Comparative Example 1 being 100. Smaller index values, particularly index values of 98 or less, indicate smaller tan δ (60° C.) and lower heat build-up, which indicates lower rolling resistance and superior fuel consumption performance when used in a pneumatic tire.

Wear Resistance

Lambourn abrasion of the obtained vulcanized rubber samples was measured in accordance with JIS K6264-2 using a Lambourn abrasion resistance test machine (manufactured by Iwamoto Quartz GlassLab Co., Ltd.) under the following conditions: 20° C. temperature, 15 N load, and 50% slip ratio. The results of the measuring were indexed and recorded in FIGS. 1A to 3D, with the index value of Comparative Example 1 being 100. Larger index values, particularly index values of 102 or above, indicate superior wear resistance.

Next, sets of four pneumatic tires having a tire size of 245/50R18 were fabricated. In each of the sets of four tires, one of the 38 types of rubber compositions for use in tire treads described above was used in the tread portion. The wet performance of each of the obtained 38 types of pneumatic tires was evaluated according to the method described below.

Wet Performance

The pneumatic tires were assembled on a wheel having a rim size of 18×8JJ, and mounted on a 2.5 L class test vehicle (made in Japan). The pneumatic tires were inflated to an air pressure of 230 kPa and the test vehicle was driven on a 2.6 km circuit wet road surface test course. The steering stability while driving was scored based on sensory evaluation performed by three experienced evaluators. The results of the measuring were indexed and recorded in FIGS. 1A to 3D, with the index value of Comparative Example 1 being 100. Larger index values, particularly index values of 102 and above, indicate superior wet steering stability on wet road surfaces.

Note that the types of raw materials used are shown in FIGS. 1A to 3D.

Modified S-SBR 1: Terminal-modified solution polymerization styrene butadiene rubber prepared according to the production method described below; modified conjugated diene polymer rubber formed from a polyorganosiloxane having the structure of the general formula (I); aromatic vinyl unit content of 42% by weight; vinyl unit content of 32%; weight-average molecular weight (Mw) of 750,000; Tg of −25° C.; oil extended product comprising 25 parts by weight of oil per 100 parts by weight of the rubber component.

Production Method of Modified S-SBR 1

4533 g of cyclohexane, 338.9 g (3.254 mol) of styrene, 468.0 g (8.652 mol) of butadiene, 20.0 g (0.294 mol) of isoprene, and 0.189 mL (1.271 mmol) of N,N,N',N'-tetramethylethylenediamine were added to a nitrogen-purged autoclave reaction vessel having an internal capacity of 10 L. Then, agitation was begun. After adjusting the temperature of the matter in the reaction vessel to 50° C., 5.061 mL (7.945 mmol) of n-butyllithium was added. After the rate of polymerization conversion reached approximately 100%, 12.0 g more of isoprene was added and the mixture was reacted for five minutes. Then, 0.281 g (0.318 mmol) of a toluene solution containing 40% by weight of 1,6-bis(trichlorosilyl)hexane was added and the mixture was reacted for 30 minutes. Furthermore, 18.3 g (0.318 mmol) of a xylene solution containing 40% by weight of polyorganosiloxane A described below was added and the mixture was reacted for 30 minutes. 0.5 mL of methanol was added and the mixture was agitated for 30 minutes. A small amount of antiaging agent (IRGANOX 1520, manufactured by BASF) and 25 parts of Fukko Luella Ceramic 30 (manufactured by Nippon Oil Corporation) as an extension oil were added to the resulting polymer solution. Then, the solid rubber was recovered using a steam stripping process. The obtained solid rubber was dehydrated using an open roll and dried in a dryer. Thus, the modified S-SBR 1 was obtained.

Polyorganosiloxane A: Polyorganosiloxane having the structure of the general formula (I), in which m=80, n=0, k=120, $X^1$, $X^4$, $R^1$ to $R^3$, $R^5$ to $R^8$ are each methyl groups (—$CH_3$), and $X^2$ is a hydrocarbon group expressed by formula (VIII) below.

Formula 10

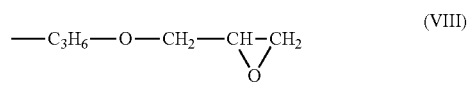

Modified S-SBR 2: Terminal-modified solution polymerization styrene butadiene rubber prepared according to the production method described below; modified conjugated diene polymer rubber formed from a polyorganosiloxane having the structure of the general formula (II); aromatic vinyl unit content of 42% by weight; vinyl unit content of 32%; weight-average molecular weight (Mw) of 750,000; Tg of −25° C.; oil extended product comprising 25 parts by weight of oil per 100 parts by weight of the rubber component.

Production Method of Modified S-SBR 2

4550 g of cyclohexane, 341.1 g (3.275 mol) of styrene, 459.9 g (8.502 mol) of butadiene, 20.0 g (0.294 mol) of isoprene, and 0.190 mL (1.277 mmol) of N,N,N',N'-tetramethylethylenediamine were added to a nitrogen-purged autoclave reaction vessel having an internal capacity of 10 L. Then, agitation was begun. After adjusting the temperature of the matter in the reaction vessel to 50° C., 5.062 mL (7.946 mmol) of n-butyllithium was added. After the rate of polymerization conversion reached approximately 100%, 12.0 g more of isoprene was added and the mixture was reacted for five minutes. Then, 0.283 g (0.320 mmol) of a toluene solution containing 40% by weight of 1,6-bis(trichlorosilyl)hexane was added and the mixture was reacted for 30 minutes. Furthermore, 19.0 g (0.330 mmol) of a xylene solution containing 40% by weight of polyorganosiloxane B described below was added and the mixture was reacted for 30 minutes. 0.5 mL of methanol was added and the mixture was agitated for 30 minutes. A small amount of antiaging agent (IRGANOX 1520, manufactured by BASF) and 25 parts of Fukko Luella Ceramic 30 (manufactured by Nippon Oil Corporation) as an extension oil were added to the resulting polymer solution. Then, the solid rubber was recovered using a steam stripping process. The obtained solid rubber was dehydrated using an open roll and dried in a dryer. Thus, the modified S-SBR 2 was obtained.

Polyorganosiloxane B: Polyorganosiloxane having the structure of the general formula (II), wherein $R^9$ to $R^{16}$ are each methyl groups (—$CH_3$), and $X^5$ to $X^8$ are each hydrocarbon groups expressed by the formula (VIII).

Modified S-SBR 3: Terminal-modified solution polymerization styrene butadiene rubber prepared according to the production method described below; modified conjugated diene polymer rubber formed from a polyorganosiloxane having the structure of the general formula (III); aromatic vinyl unit content of 41% by weight; vinyl unit content of 32%; weight-average molecular weight (Mw) of 750,000; Tg of −25° C.; oil extended product comprising 25 parts by weight of oil per 100 parts by weight of the rubber component.

Production Method of Modified S-SBR 3

4542 g of cyclohexane, 339.2 g (3.257 mol) of styrene, 462.8 g (8.556 mol) of butadiene, 20.0 g (0.294 mol) of isoprene, and 0.188 mL (1.264 mmol) of N,N,N',N'-tetramethylethylenediamine were added to a nitrogen-purged autoclave reaction vessel having an internal capacity of 10 L. Then, agitation was begun. After adjusting the temperature of the matter in the reaction vessel to 50° C., 5.059 mL (7.942 mmol) of n-butyllithium was added. After the rate of polymerization conversion reached approximately 100%, 12.0 g more of isoprene was added and the mixture was reacted for five minutes. Then, 0.283 g (0.320 mmol) of a toluene solution containing 40% by weight of 1,6-bis(trichlorosilyl)hexane was added and the mixture was reacted for 30 minutes. Furthermore, 19.2 g (0.333 mmol) of a xylene solution containing 40% by weight of polyorganosiloxane C described below was added and the mixture was reacted for 30 minutes. 0.5 mL of methanol was added and the mixture was agitated for 30 minutes. A small amount of antiaging agent (IRGANOX 1520, manufactured by BASF) and 25 parts of Fukko Luella Ceramic 30 (manufactured by Nippon Oil Corporation) as an extension oil were added to the resulting polymer solution. Then, the solid rubber was recovered using a steam stripping process. The obtained solid rubber was dehydrated using an open roll and dried in a dryer. Thus, the modified S-SBR 3 was obtained.

Polyorganosiloxane C: Polyorganosiloxane having the structure of the general formula (III), wherein s=2, $R^{17}$ to $R^{19}$ are each methyl groups (—$CH_3$), and $X^9$ to $X^{11}$ are each hydrocarbon groups expressed by the formula (VIII).

Modified S-SBR 4: Terminal-modified solution polymerization styrene butadiene rubber; aromatic vinyl unit content of 30% by weight; vinyl unit content of 61% by weight; weight-average molecular weight (Mw) of 590,000; Tg of −25° C.; Nipol NS530 (manufactured by Zeon Corporation); oil extended product comprising 20 parts by weight of oil per 100 parts by weight of the rubber component.

Modified S-SBR 5: Terminal-modified solution polymerization styrene butadiene rubber; aromatic vinyl unit content of 16% by weight; vinyl unit content of 32% by weight; weight average molecular weight (Mw) of 610,000; Tg of −60° C.; Nipol NS612 (manufactured by Zeon Corporation); non-oil extended product.

Modified S-SBR 6: Terminal-modified solution polymerization styrene butadiene rubber prepared according to the production method described below; modified conjugated diene polymer rubber formed from a polyorganosiloxane having the structure of the general formula (I); aromatic vinyl unit content of 34% by weight; vinyl unit content of 34%; weight-average molecular weight (Mw) of 760,000; Tg of −33° C.; oil extended product comprising 25 parts by weight of oil per 100 parts by weight of the rubber component.

Production Method of Modified S-SBR 6

4541 g of cyclohexane, 277.6 g (2.665 mol) of styrene, 523.1 g (9.671 mol) of butadiene, 20.0 g (0.294 mol) of isoprene, and 0.175 mL (1.178 mmol) of N,N,N',N'-tetramethylethylenediamine were added to a nitrogen-purged autoclave reaction vessel having an internal capacity of 10 L. Then, agitation was begun. After adjusting the temperature of the matter in the reaction vessel to 50° C., 4.984 mL (7.824 mmol) of n-butyllithium was added. After the rate of polymerization conversion reached approximately 100%, 12.0 g more of isoprene was added and the mixture was reacted for five minutes. Then, 0.273 g (0.327 mmol) of a toluene solution containing 40% by weight of 1,6-bis(trichlorosilyl)hexane was added and the mixture was reacted for 30 minutes. Furthermore, 18.1 g (0.314 mmol) of a xylene solution containing 40% by weight of the polyorganosiloxane A described above was added and the mixture was reacted for 30 minutes. 0.5 mL of methanol was added and the mixture was agitated for 30 minutes. A small amount of antiaging agent (IRGANOX 1520, manufactured by BASF) and 25 parts of Fukko Luella Ceramic 30 (manufactured by Nippon Oil Corporation) as an extension oil were added to the resulting polymer solution. Then, the solid rubber was recovered using a steam stripping process. The obtained solid rubber was dehydrated using an open roll and dried in a dryer. Thus, the modified S-SBR 6 was obtained.

Modified S-SBR 7: Terminal-modified solution polymerization styrene butadiene rubber prepared according to the production method described below; modified conjugated diene polymer rubber formed from a polyorganosiloxane having the structure of the general formula (I); aromatic vinyl unit content of 49% by weight; vinyl unit content of 28%; weight-average molecular weight (Mw) of 710,000; Tg of −17° C.; oil extended product comprising 25 parts by weight of oil per 100 parts by weight of the rubber component.

Production Method of Modified S-SBR 7

4536 g of cyclohexane, 401.0 g (3.850 mol) of styrene, 392.0 g (7.247 mol) of butadiene, 20.0 g (0.294 mol) of isoprene, and 0.201 mL (1.352 mmol) of N,N,N',N'-tetramethylethylenediamine were added to a nitrogen-purged autoclave reaction vessel having an internal capacity of 10 L. Then, agitation was begun. After adjusting the temperature of the matter in the reaction vessel to 50° C., 5.141 mL (8.071 mmol) of n-butyllithium was added. After the rate of polymerization conversion reached approximately 100%, 12.0 g more of isoprene was added and the mixture was reacted for five minutes. Then, 0.279 g (0.320 mmol) of a toluene solution containing 40% by weight of 1,6-bis(trichlorosilyl)hexane was added and the mixture was reacted for 30 minutes. Furthermore, 18.6 g (0.323 mmol) of a xylene solution containing 40% by weight of the polyorganosiloxane A described above was added and the mixture was reacted for 30 minutes. 0.5 mL of methanol was added and the mixture was agitated for 30 minutes. A small amount of antiaging agent (IRGANOX 1520, manufactured by BASF) and 25 parts of Fukko Luella Ceramic 30 (manufactured by Nippon Oil Corporation) as an extension oil were added to the resulting polymer solution. Then, the solid rubber was recovered using a steam stripping process. The obtained solid rubber was dehydrated using an open roll and dried in a dryer. Thus, the modified S-SBR 7 was obtained.

Modified S-SBR 8: Terminal-modified solution polymerization styrene butadiene rubber prepared according to the production method described below; modified conjugated diene polymer rubber formed from a polyorganosiloxane having the structure of the general formula (I); aromatic vinyl unit content of 41% by weight; vinyl unit content of 17%; weight-average molecular weight (Mw) of 740,000; Tg of −37° C.; oil extended product comprising 25 parts by weight of oil per 100 parts by weight of the rubber component.

Production Method of Modified S-SBR 8

4542 g of cyclohexane, 339.2 g (3.257 mol) of styrene, 462.8 g (8.556 mol) of butadiene, 20.0 g (0.294 mol) of isoprene and 0.0376 mL (0.253 mmol) of N,N,N',N'-tetramethylethylenediamine were added to a nitrogen-purged autoclave reaction vessel having an internal capacity of 10 L. Then, agitation was begun. After adjusting the temperature of the matter in the reaction vessel to 50° C., 5.059 mL (7.942 mmol) of n-butyllithium was added. After the rate of polymerization conversion reached approximately 100%, 12.0 g more of isoprene was added and the mixture was reacted for five minutes. Then, 0.280 g (0.331 mmol) of a toluene solution containing 40% by weight of 1,6-bis(trichlorosilyl)hexane was added and the mixture was reacted for 30 minutes. Furthermore, 18.8 g (0.326 mmol) of a xylene solution containing 40% by weight of the polyorganosiloxane A described above was added and the mixture was reacted for 30 minutes. 0.5 mL of methanol was added and the mixture was agitated for 30 minutes. A small amount of antiaging agent (IRGANOX 1520, manufactured by BASF) and 25 parts of Fukko Luella Ceramic 30 (manufactured by Nippon Oil Corporation) as an extension oil were added to the resulting polymer solution. Then, the solid rubber was recovered using a steam stripping process. The obtained solid rubber was dehydrated using an open roll and dried in a dryer. Thus, the modified S-SBR 8 was obtained.

Modified S-SBR 9: Terminal-modified solution polymerization styrene butadiene rubber prepared according to the production method described below; modified conjugated diene polymer rubber formed from a polyorganosiloxane having the structure of the general formula (I); aromatic vinyl unit content of 39% by weight; vinyl unit content of 40%; weight-average molecular weight (Mw) of 750,000; Tg of −21° C.; oil extended product comprising 25 parts by weight of oil per 100 parts by weight of the rubber component.

Production Method of Modified S-SBR 9

4543 g of cyclohexane, 319.8 g (3.071 mol) of styrene, 480.1 g (8.876 mol) of butadiene, 20.0 g (0.294 mol) of isoprene and 0.217 mL (1.462 mmol) of N,N,N',N'-tetramethylethylenediamine were added to a nitrogen-purged autoclave reaction vessel having an internal capacity of 10 L. Then, agitation was begun. After adjusting the temperature of the matter in the reaction vessel to 50° C., 5.141 mL (8.0714 mmol) of n-butyllithium was added. After the rate of polymerization conversion reached approximately 100%, 12.0 g more of isoprene was added and the mixture was reacted for five minutes. Then, 0.279 g (0.320 mmol) of a toluene solution containing 40% by weight of 1,6-bis(trichlorosilyl)hexane was added and the mixture was reacted for 30 minutes. Furthermore, 18.6 g (0.323 mmol) of a xylene solution containing 40% by weight of the polyorganosiloxane A described above was added and the mixture was reacted for 30 minutes. 0.5 mL of methanol was added and the mixture was agitated for 30 minutes. A small amount of antiaging agent (IRGANOX 1520, manufactured by BASF) and 25 parts of Fukko Luella Ceramic 30 (manufactured by Nippon Oil Corporation) as an extension oil were added to the resulting polymer solution. Then, the solid rubber was recovered using a steam stripping process. The obtained solid rubber was dehydrated using an open roll and dried in a dryer. Thus, the modified S-SBR 9 was obtained.

Modified S-SBR 10: Terminal-modified solution polymerization styrene butadiene rubber; aromatic vinyl unit content of 37% by weight; vinyl unit content of 43% by weight; weight-average molecular weight (Mw) of 1,200,000; Tg of −27° C.; Tafuden E581 (manufactured by Asahi Kasei Chemicals Corporation); oil extended product comprising 37.5 parts by weight of oil per 100 parts by weight of the rubber component.

S-SBR: Unmodified solution polymerization styrene butadiene rubber; aromatic vinyl unit content of 41% by weight; vinyl unit content of 25% by weight; weight-average molecular weight (Mw) of 1,010,000; Tg of −30° C.; SLR6430 (manufactured by Dow Chemical); oil extended product comprising 37.5 parts by weight of oil per 100 parts by weight of the rubber component.

BR: Butadiene rubber; Nipol BR1220 (manufactured by Zeon Corporation)

Silica-a (silica 1): Zeosil 1165MP (manufactured by Rhodia Corp.); DBP absorption number of 200 mL/100 g; nitrogen adsorption specific surface area ($N_2SA$) of 160 m$^2$/g; CTAB specific surface area (CTAB) of 159 m$^2$/g; $N_2SA$/CTAB of 1.01

Silica-b: Zeosil 1115GR (manufactured by Rhodia Corp.); DBP absorption number of 160 mL/100 g; nitrogen adsorption specific surface area ($N_2SA$) of 115 m$^2$/g; CTAB specific surface area (CTAB) of 110 m$^2$/g, $N_2SA$/CTAB of 1.06

CB1: Carbon black; SEAST 7HM (manufactured by Tokai Carbon Co., Ltd.); $N_2SA$ of 123 m$^2$/g CB2: Carbon black; SEAST KHA (manufactured by Tokai Carbon Co., Ltd.); $N_2SA$ of 77 m$^2$/g Terpene resin 1: Aromatic modified terpene resin with softening point of 125° C.; YS Resin TO-125 (manufactured by Yasuhara Chemical Co., Ltd.)

Terpene resin 2: Aromatic modified terpene resin with softening point of 85° C.; YS Resin TO-85 (manufactured by Yasuhara Chemical Co., Ltd.)

Terpene resin 3: Aromatic modified terpene resin with softening point of 105° C.; YS Resin TO-105 (manufactured by Yasuhara Chemical Co., Ltd.)

Coupling agent: Si69 (manufactured by Evonik Degussa Industries)

Oil: Extract No. 4S (manufactured by Showa Shell Sekiyu K.K.)

The types of raw materials used in the shared components of FIG. 4 are as follows.

Stearic acid: Beads Stearic Acid YR (manufactured by NOF Corp.)

Antiaging agent: Santoflex 6PPD (manufactured by Flexsys)

Wax: SANNOC (manufactured by Ouchi Shinko Chemical Industrial)

Zinc oxide: Zinc Oxide #3 (manufactured by Seido Chemical Industry Co., Ltd.)

Sulfur: "Golden Flower" oil-treated sulfur powder (manufactured by Tsurumi Chemical Industry Co., Ltd.)

Vulcanization Accelerator 1: Vulcanization accelerator CBS; Nocceler CZ-G (manufactured by Ouchi Shinko Chemical Industrial Co., Ltd.)

Vulcanization Accelerator 2: Vulcanization accelerator DPG; Nocceler D (manufactured by Ouchi Shinko Chemical Industrial Co., Ltd.)

As is clear from FIGS. 1A-1B, with the rubber compositions for use in tire treads of Working Examples 1 to 20, enhanced low rolling resistance (tan δ at 60° C.), wet performance, and wear resistance were confirmed.

As is clear from FIGS. 2A-2D, with the rubber composition of Comparative Example 2, the rolling resistance (tan δ at 60° C.), the wet performance and the wear resistance cannot be improved because the aromatic vinyl unit content in the modified S-SBR 4 is less than 38% by weight, the vinyl unit content exceeds 35% by weight, and the weight-average molecular weight is less than 600,000. With the rubber composition for use in tire treads of Comparative Example 3, rolling resistance is negatively affected and wear resistance cannot be sufficiently improved because the dispersibility of silica is diminished because unmodified S-SBR was compounded instead of modified conjugated diene polymer rubber. With the rubber composition of Comparative Example 4, the wet performance is negatively affected because the aromatic vinyl unit content in the modified S-SBR 5 is less than 38% by weight, the vinyl unit content exceeds 35% by weight, and the weight-average molecular weight is less than 600,000. With the rubber composition of Comparative Example 5, the wet performance is negatively affected because the aromatic vinyl unit content in the modified S-SBR 6 is less than 38% by weight. With the rubber composition of Comparative Example 6, the rolling resistance and wear resistance are negatively affected because the aromatic vinyl unit content in the modified S-SBR 7 exceeds 48% by weight.

With the rubber composition of Comparative Example 7, the wet performance cannot be improved because the vinyl unit content in the modified S-SBR 8 is less than 20% by weight. With the rubber composition of Comparative Example 8, the rolling resistance is negatively affected because the vinyl unit content in the modified S-SBR 9 exceeds 35% by weight. With the rubber composition of Comparative Example 9, the wet performance cannot be improved because the compounded amount of butadiene rubber exceeds 40% by weight. With the rubber composition of Comparative Example 10, the wear resistance is negatively affected and sufficient rolling resistance improvement is not obtained because the compounded amount of butadiene rubber is less than 11% by weight.

As is clear from FIGS. 3A-3D, with the rubber composition of Comparative Example 11, the rolling resistance is negatively affected and the wear resistance cannot be improved because the compounded amount of the modified S-SBR 1 is less than 35% by weight. With the rubber composition of Comparative Example 12, the wear resistance is negatively affected and the rolling resistance cannot be sufficiently improved because the compounded amount of the modified S-SBR 1 exceeds 89% by weight and the compounded amount of butadiene rubber is less than 11% by weight. With the rubber composition of Comparative Example 13, the wet performance is negatively affected and the wear resistance cannot be sufficiently improved because the total compounded amount of the filler is less than 100 parts by weight. With the rubber composition of Comparative Example 14, the rolling resistance is negatively affected and the wet performance cannot be improved because the silica ratio in the total amount of filler is less than 70% by weight. With the rubber composition of Comparative Example 15, the rolling resistance is negatively affected because the compounded amount of the filler exceeds 150 parts by weight. With the rubber composition of Comparative Example 16, the wet performance cannot be enhanced because the weight ratio Wte/Wbr of terpene resin to butadiene rubber is less than 0.5. With the rubber composition of Comparative Example 17, the rolling resistance and wear resistance are negatively affected because the ratio Wte/Wbr exceeds 1.3. With the rubber composition of Comparative Example 18, the wet performance is negatively affected because the softening point of the terpene resin 2 is less than 100° C. Furthermore, the rolling resistance cannot be sufficiently improved.

What is claimed is:

1. A rubber composition for use in tire treads, the composition comprising, per 100 parts by weight of a diene rubber containing from 35% to 89% by weight of a modified conjugated diene polymer rubber and from 11% to 40% by weight of butadiene rubber, from 3 to 60 parts by weight of aromatic modified terpene resin; and from 100 to 150 parts by weight of a filler;
the filler containing not less than 70% by weight of silica;
a ratio Wte/Wbr of the compounded amount of aromatic modified terpene resin Wte to the compounded amount of butadiene rubber Wbr being from 0.5 to 1.3;

the modified conjugated diene polymer rubber having a terminal modified group, obtained by reacting at least one type of compound comprising a functional group that is reactable with an active terminal of an active conjugated diene polymer chain, with the active conjugated diene polymer chain obtained by copolymerizing a conjugated diene monomer and an aromatic vinyl monomer in a hydrocarbon solvent using an organic active metal compound as an initiator; the terminal modified group comprising a functional group that interacts with silica;

an aromatic vinyl unit content being from 38% to 48% by weight of the modified conjugated diene polymer rubber, vinyl unit content being from 20% to 35% by weight of the modified conjugated diene polymer rubber, and weight-average molecular weight of the modified conjugated diene polymer rubber being from 600,000 to 1,000,000; and a softening point of the aromatic modified terpene resin being from 100° C. to 150° C.; and the compound comprising the functional group that is reactable with the active terminal of the active conjugated diene polymer chain comprises at least one type of polyorganosiloxane compound selected from general formulae (I) to (III) below:

Formula 1

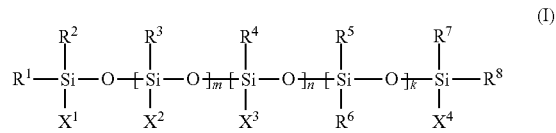

In formula (I), $R^1$ to $R^8$ are identical or different and are alkyl groups having from 1 to 6 carbons or aryl groups having from 6 to 12 carbons; $X^1$ and $X^4$ are identical or different and are groups having functional groups that react with the active terminal of the active conjugated diene polymer chain, alkyl groups having from 1 to 6 carbons, or aryl groups having from 6 to 12 carbons; $X^2$ is a group having a functional group that reacts with the active terminal of the active conjugated diene polymer chain; $X^3$ is a group including from 2 to 20 repeating alkylene glycol units, a portion of the $X^3$ moieties optionally being groups derived from groups including from 2 to 20 repeating alkylene glycol units; and m is an integer from 3 to 200, n is an integer from 0 to 200, and k is an integer from 0 to 200;

Formula 2

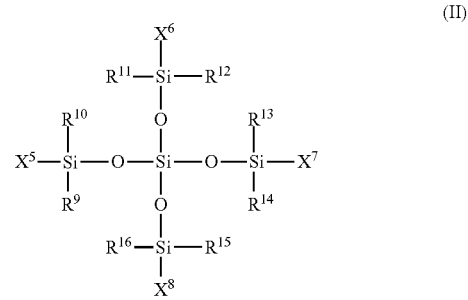

In formula (II), $R^9$ to $R^{16}$ are identical or different and are alkyl groups having from 1 to 6 carbons or aryl groups having from 6 to 12 carbons; and $X^5$ to $X^8$ are groups having functional groups that react with the active terminal of the active conjugated diene polymer chain;

Formula 3

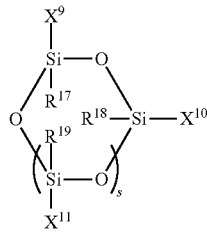

(III)

In formula (III), $R^{17}$ to $R^{19}$ are identical or different and are alkyl groups having from 1 to 6 carbons or aryl groups having from 6 to 12 carbons; and $X^9$ to $X^{11}$ are groups having functional groups that react with the active terminal of the active conjugated diene polymer chain; and s is an integer from 1 to 18.

2. The rubber composition for use in tire treads according to claim 1, wherein not less than 70% by weight of the silica has a DBP absorption number of from 185 to 250 mL/100 g and a ratio ($N_2SA$/CTAB) of nitrogen adsorption specific surface area ($N_2SA$) to CTAB specific surface area (CTAB) of from 0.90 to 1.25.

3. The rubber composition for use in tire treads according to claim 2, comprising carbon black of which a nitrogen adsorption specific surface area is from 70 to 165 $m^2$/g.

4. The rubber composition for use in tire treads according to claim 3, further comprising, in addition to a first modified conjugated diene polymer rubber which is the modified conjugated diene polymer rubber, a second modified conjugated diene polymer rubber in a quantity of not more than 54% by weight of the diene rubber.

5. The rubber composition for use in tire treads according to claim 3, further comprising, in addition to a first modified conjugated diene polymer rubber which is the modified conjugated diene polymer rubber, a second modified conjugated diene polymer rubber in a quantity of not more than 54% by weight of the diene rubber.

6. The rubber composition for use in tire treads according to claim 2, further comprising, in addition to a first modified conjugated diene polymer rubber which is the modified conjugated diene polymer rubber, a second modified conjugated diene polymer rubber in a quantity of not more than 54% by weight of the diene rubber.

7. The rubber composition for use in tire treads according to claim 1, comprising carbon black of which a nitrogen adsorption specific surface area is from 70 to 165 $m^2$/g.

8. A pneumatic tire comprising the rubber composition for use in tire treads described in claim 1.

9. A pneumatic tire comprising the rubber composition for use in tire treads described in claim 4.

10. A pneumatic tire comprising the rubber composition for use in tire treads described in claim 3.

11. A pneumatic tire comprising the rubber composition for use in tire treads described in claim 2.

* * * * *